(12) United States Patent
Hibino

(10) Patent No.: US 11,061,589 B2
(45) Date of Patent: Jul. 13, 2021

(54) STORAGE MANAGEMENT APPARATUS, STORAGE SYSTEM, AND NON-TRANSITORY COMPUTER-READABLE RECORDING MEDIUM HAVING STORED THEREIN STORAGE MANAGEMENT PROGRAM

(71) Applicant: FUJITSU LIMITED, Kawasaki (JP)

(72) Inventor: Tetsuya Hibino, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/284,669

(22) Filed: Feb. 25, 2019

(65) Prior Publication Data
US 2019/0278501 A1  Sep. 12, 2019

(30) Foreign Application Priority Data
Mar. 9, 2018  (JP) .............................. JP2018-042748

(51) Int. Cl.
*H04L 12/24*  (2006.01)
*G06F 3/06*  (2006.01)

(52) U.S. Cl.
CPC ............ *G06F 3/0632* (2013.01); *G06F 3/067* (2013.01); *G06F 3/0607* (2013.01); *H04L 41/0213* (2013.01); *H04L 41/082* (2013.01); *H04L 41/0873* (2013.01)

(58) Field of Classification Search
CPC ...... G06F 3/0632; G06F 3/0607; G06F 3/067; H04L 41/0213; H04L 41/082; H04L 41/0873
See application file for complete search history.

(56) References Cited

U.S. PATENT DOCUMENTS

| 9,602,614 | B1 * | 3/2017 | Shankaran | G06F 12/0806 |
| 2007/0118507 | A1 * | 5/2007 | Bruner | G06F 8/65 |
| 2007/0276916 | A1 * | 11/2007 | McLoughlin | G06F 8/658 |
| | | | | 709/208 |
| 2009/0150878 | A1 * | 6/2009 | Pathak | G06F 8/65 |
| | | | | 717/172 |

(Continued)

FOREIGN PATENT DOCUMENTS

JP  2017-54416  3/2017

*Primary Examiner* — Viet D Vu
(74) *Attorney, Agent, or Firm* — Staas & Halsey LLP

(57) ABSTRACT

A storage management apparatus includes a memory configured to store configuration information regarding a configuration of a storage apparatus, first update information indicating an update status of the configuration information, and second update information pieces, the configuration information including information elements, the second update information pieces indicating respective update statuses of the information elements, and a processor configured to: obtain first update information from a storage controller that controls the storage apparatus; compare the obtained first update information with the first update information in the memory; send, to the storage controller, the second update information pieces in the memory, when both of the update information do not match; receive, from the storage controller, one or more information elements extracted in the storage controller based on the second update information pieces that are sent; and update the configuration information in the memory based on the received information elements.

15 Claims, 29 Drawing Sheets

(56) References Cited

U.S. PATENT DOCUMENTS

| | | | |
|---|---|---|---|
| 2013/0007183 A1* | 1/2013 | Sorenson, III | G06F 3/0607 |
| | | | 709/213 |
| 2014/0317229 A1* | 10/2014 | Hughes | H04W 4/50 |
| | | | 709/217 |
| 2015/0248254 A1* | 9/2015 | Matsunaga | G06F 3/061 |
| | | | 711/5 |
| 2016/0105313 A1* | 4/2016 | Jha | G06F 11/1451 |
| | | | 709/217 |
| 2017/0046152 A1* | 2/2017 | Shih | G06F 11/1433 |
| 2017/0078151 A1 | 3/2017 | Usuda et al. | |

* cited by examiner

FIG. 3

SYNCHRONIZATION
CONTROL COUNTER 122b, 131b

| APPARATUS SERIAL NUMBER | COUNTER NUMBER |
|---|---|

FIG. 15

APPARATUS INFORMATION,
ADMINISTRATION INFORMATION 221,311

<pool Table>

221a,311a

| name | id | xxxx | yyyy | zzzz | ... |
|---|---|---|---|---|---|
| poolA | number | aaaa | bbbb | cccc | dddd |
| poolB | number | aaaa | bbbb | cccc | dddd |
| ... | ... | ... | ... | ... | ... |

<port Table>

221b,311b

| name | id | xxxx | yyyy | zzzz | ... |
|---|---|---|---|---|---|
| portA | number | aaaa | bbbb | cccc | dddd |
| portB | number | aaaa | bbbb | cccc | dddd |
| ... | ... | ... | ... | ... | ... |

<volume Table>

221c,311c

| name | id | xxxx | yyyy | zzzz | ... |
|---|---|---|---|---|---|
| volume0 | number | aaaa | bbbb | cccc | dddd |
| volume1 | number | aaaa | bbbb | cccc | dddd |
| ... | ... | ... | ... | ... | ... |
| volume1000 | number | aaaa | bbbb | cccc | dddd |
| volume1001 | number | aaaa | bbbb | cccc | dddd |
| ... | ... | ... | ... | ... | ... |

SYNCHRONIZATION CONTROL COUNTER 222, 312

| apparatus serial number | representative counter | pool counter | port counter | volume counter (0-1000) | volume counter (1001-yyyy) | ... |
|---|---|---|---|---|---|---|
| | number | number | number | number | number | number |

222a, 312a: (representative counter group)
222b, 312b: individual counter

STORAGE MANAGEMENT APPARATUS, STORAGE SYSTEM, AND NON-TRANSITORY COMPUTER-READABLE RECORDING MEDIUM HAVING STORED THEREIN STORAGE MANAGEMENT PROGRAM

CROSS-REFERENCE TO RELATED APPLICATION

This application is based upon and claims the benefit of priority of the prior Japanese Patent Application No. 2018-042748, filed on Mar. 9, 2018, the entire contents of which are incorporated herein by reference.

FIELD

The present embodiment relates to a storage management apparatus, a storage system, and a non-transitory computer-readable recording medium having stored therein a storage management program.

BACKGROUND

In storage systems, storage management apparatuses may be used, which provide various functions including managements of the storage apparatuses, such as configuration managements, failure managements, and performance information managements of the storage apparatuses.

In order to embody such functions of storage management apparatuses, storage management apparatuses synchronize apparatus information on storage apparatuses, such as configuration information and status information, for example, retained in the storage management apparatuses, swiftly with storage controllers that control the storage apparatuses, using particular synchronization techniques. Such techniques can make the information on the storage apparatuses to be updated to its latest possible state.

One of such synchronization techniques employed by storage management apparatuses is a technique employing counters, values of which are modified in response to the apparatus information being updated.

In this technique, for example, a storage management apparatus obtains a counter from a storage controller, and obtains all apparatus information from the storage controller if there is any difference between the value of the obtained counter and the value of a counter that was obtained previously and is retained in the storage management apparatus. The storage management apparatus then compares the obtained apparatus information, with the previous apparatus information retained for comparison, and reflects differential data identified in this comparison into a database managed by the storage management apparatus.

Patent Document 1: Japanese Laid-open Patent Publication No. 2017-54416

In recent years, as the scales of storage apparatuses continue to increase, scale-out storage apparatuses have been developed. In the synchronization technique describe above, all apparatus information on a storage apparatus (all of apparatus information on storages in the storage apparatus) is transmitted between a storage management apparatus and a storage controller. Synchronizations in large-scale storage apparatuses, hence, lead to transmissions of enormous amount of apparatus information.

As a result, as the scales of storage apparatuses increase, delays may be experienced, such as the delay of processing to extract differentials in storage management apparatuses, and congestions in networks caused by transfers of massive volume of data, which may make fast synchronizations of apparatus information difficult.

In addition, the data size exceeding a certain value (e.g., 5 MB) can make the networks susceptible to communication errors, which may make reliable synchronizations (e.g., long-distance synchronizations) difficult.

Furthermore, past data is saved in storage management apparatuses for making comparisons of apparatus information. In this case, as the scales of storage apparatuses increase, greater disk resources may be consumed for saving the past data.

As set forth above, depending on scales (configurations) of a storage apparatus, synchronization of apparatus information on the storage apparatus between a storage management apparatus and a storage controller may become inefficient.

SUMMARY

According to an aspect of the embodiments, a storage management apparatus may include a memory, and a processor coupled to the memory. The memory may be configured to store configuration information regarding a configuration of a storage apparatus, first update information indicating an update status of the configuration information, and a plurality of second update information pieces. The configuration information may include a plurality of information elements, and the plurality of second update information pieces may indicate respective update statuses of the plurality of information elements. The processor may be configured to obtain first update information from a storage controller that controls the storage apparatus. The processor may be further configured to compare the obtained first update information with the first update information stored in the memory. The processor may be further configured to send, to the storage controller, the plurality of second update information pieces stored in the memory, when the obtained first update information does not match the first update information stored in the memory. The processor is further configured to receive, from the storage controller, one or more information elements that are extracted in the storage controller based on the plurality of second update information pieces that are sent. The processor may be further configured to update the configuration information stored in the memory based on the received one or more information elements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting a synchronization control counter in accordance with the comparative example;

FIG. 15 is a diagram depicting one example of administration information depicted in FIG. 13 or apparatus information depicted in FIG. 14;

FIG. 16 is a diagram depicting one example of a synchronization control counter depicted in FIG. 13 or 14;

DESCRIPTION OF EMBODIMENTS

Figure 1:
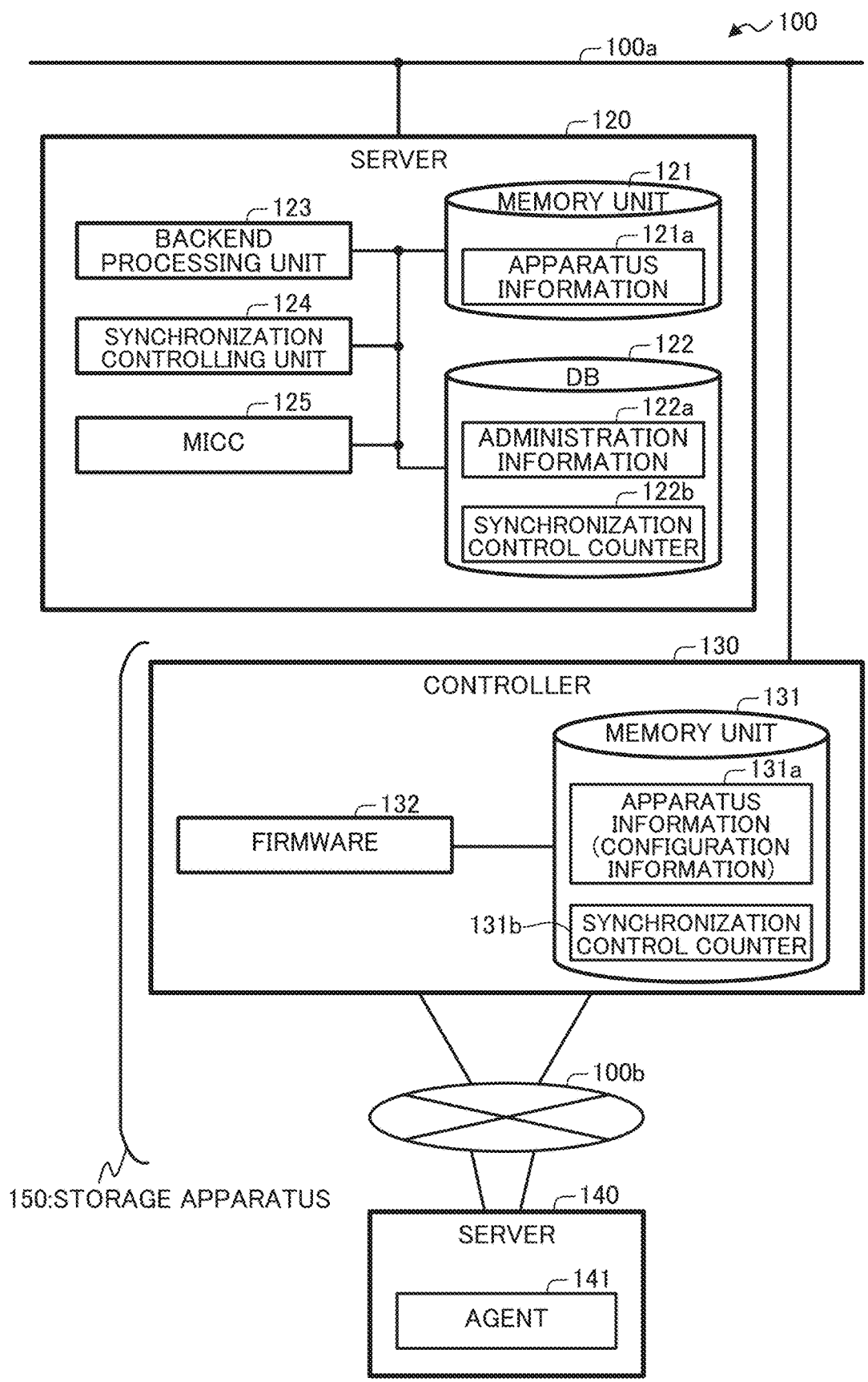
FIG. 1 is a block diagram depicting a configuration of a storage system in accordance with a comparative example.

Hereinafter, embodiments of the present disclosure will be described with reference to the drawings. Note that the embodiments described below are merely exemplary, and it is not intended to exclude a wide variety of modifications to and applications of techniques that are not described explicitly in the embodiments. For example, the present embodiment may be practiced in various modifications without departing from the spirit thereof. Note that elements referenced to by the same reference symbols in the drawings mentioned in the following descriptions denote the same or similar elements, unless otherwise stated.

(1) One Embodiment (1-1) Comparative Example

FIG. 1 is a block diagram depicting an example of a configuration of a storage system 100 in accordance with a comparative example. As depicted in FIG. 1, the storage system 100 may include a server 120, a controller 130, and a server 140, for example. Note that block diagrams in FIG. 1 exemplify functional blocks, when focusing on synchronization processing of apparatus information, and other functional blocks, such as those used for operations related to business operations in the storage system 100, are omitted.

The server 120 is one example of a storage management apparatus, and is communicatively connected to each other to the controller 130 via a network 100a, such as a local area network (LAN).

The controller 130 is one example of a storage controller configured to control a storage apparatus 150. The controller 130 provides the server 140 with storing areas in the storage apparatus 150 via a network 100b, such as a Storage Area Network (SAN). Although storages (storing apparatuses having storing areas) provided in the storage apparatus 150 are not illustrated in FIG. 1, the storage apparatus 150 may include multiple storages connected to the storage apparatus 150 via the network 100b or the like, for example.

For example, the controller 130 includes a memory unit 131 and firmware 132. The memory unit 131 may store apparatus information 131a and a synchronization control counter 131b.

Figure 2:
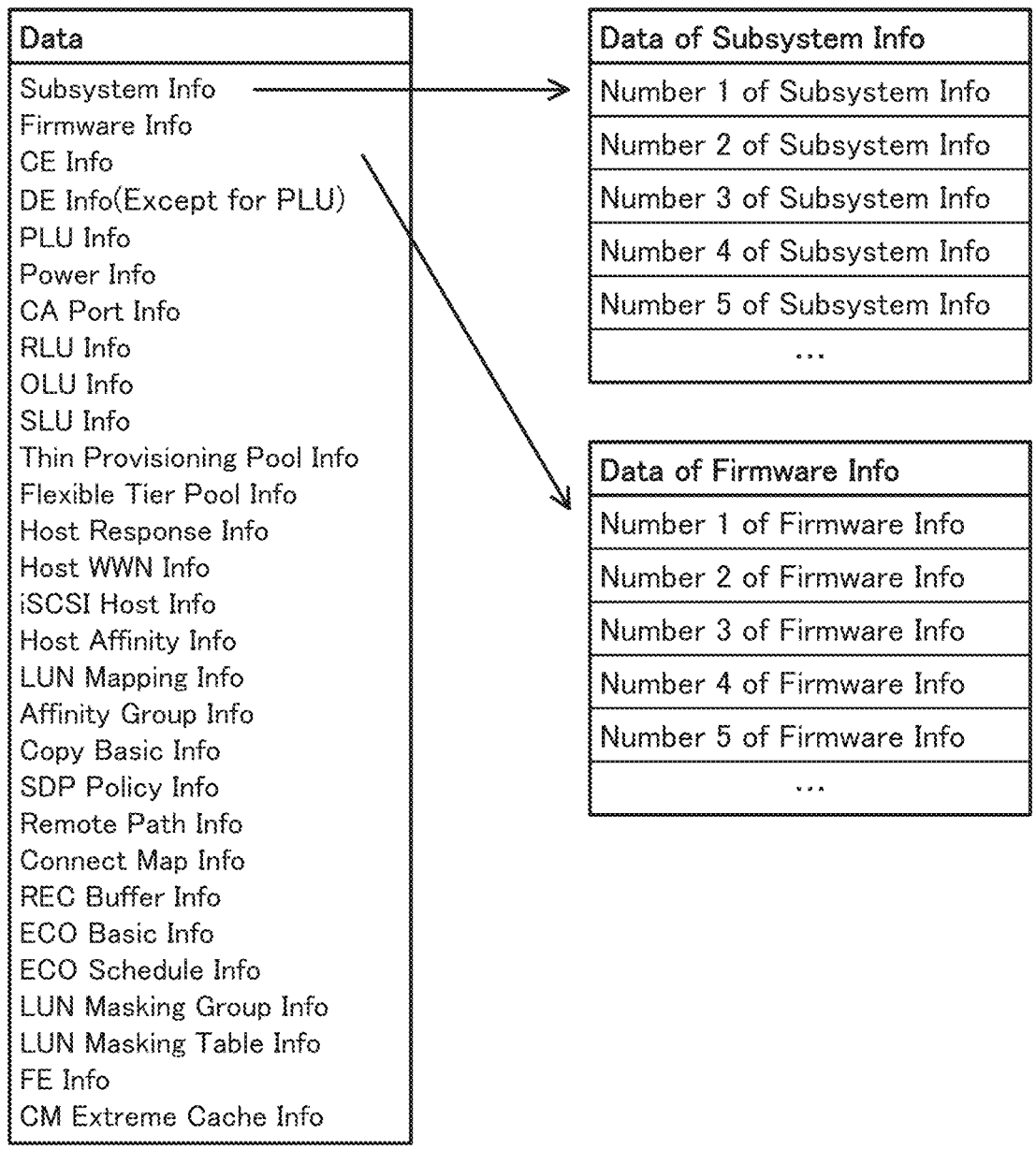
FIG. 2 is a diagram depicting apparatus information in accordance with the comparative example.

As exemplified in FIG. 2, the apparatus information 131a includes various information, such as configuration information and status information in the storage apparatus 150. Note that, in FIG. 2, each of information in the "data" table, such as "Subsystem Info" and "Firmware Info", may include multiple contents, as those labeled as "Data of Subsystem Info" and "Data of Firmware Info". In addition, each piece of information may be maintained in a separate table related to the "data" table via a pointer or the like, for example.

As exemplified in FIG. 3, the synchronization control counter 131b contains the serial number and a counter of the storage apparatus 150. A comparative synchronization control counter 122b, which is stored in a database (DB) 122 in the server 120, may have a configuration similar to that of the synchronization control counter 131b.

The server 140 is one example of a business server which includes an agent 141 and accesses to the storage apparatus 150 via the agent 141.

Hereinafter, referring to FIGS. 4-11, operations of the storage system 100 in accordance with the comparative example depicted in FIG. 1 will be described.

Figure 4:
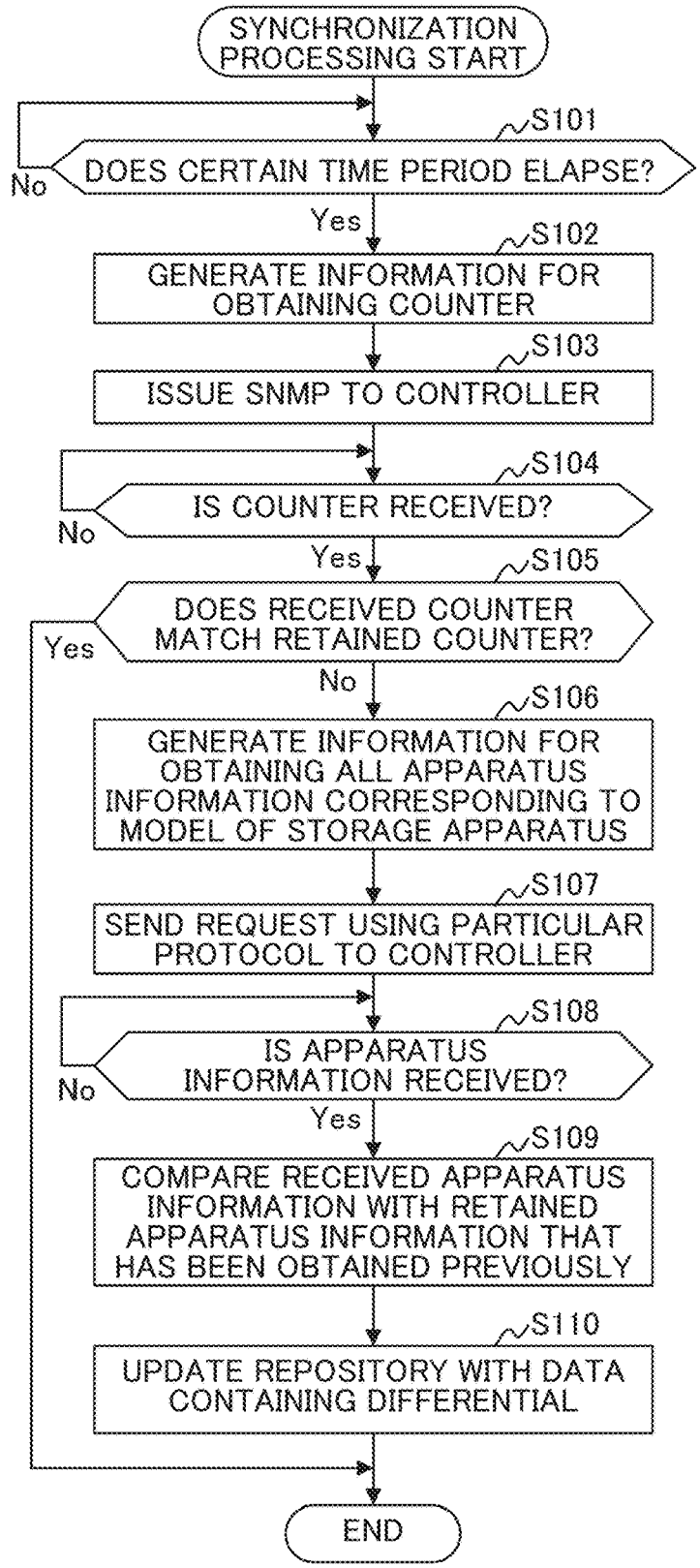
FIG. 4 is a flowchart illustrating operations of synchronization processing in accordance with the comparative example.
Figure 5:
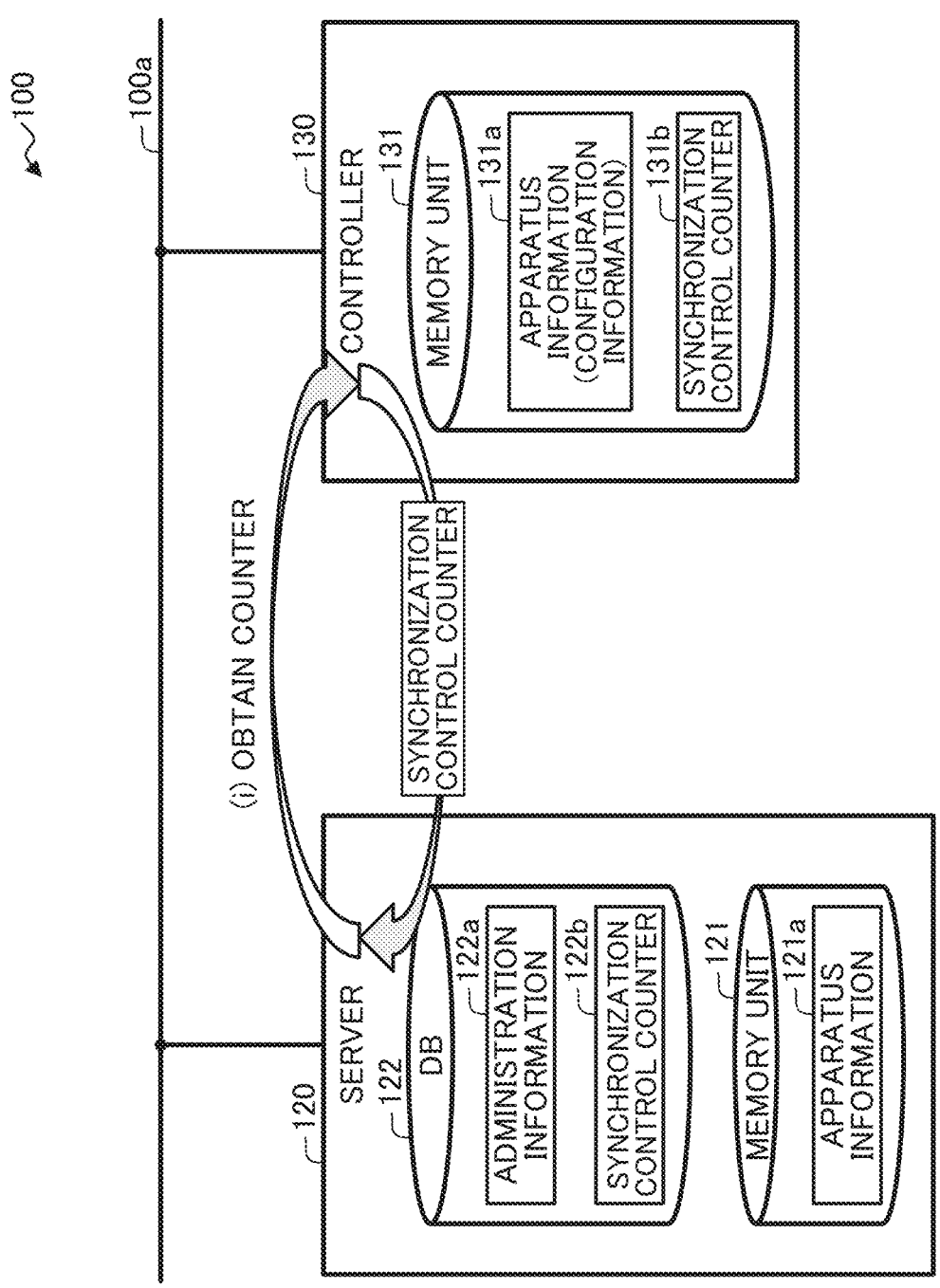
FIG. 5 is a diagram illustrating the operations of the synchronization processing depicted in FIG. 4.

As exemplified in FIG. 4, a backend processing unit 123 that carries out processing as a backend for synchronization processing (e.g., a scheduler) in the server 120 waits until certain time period elapses (Steps S101 and No from S101). When the certain time period elapses (Yes from Step S101), the backend processing unit 123 issues a counter request for obtaining a synchronization control counter 131$b$ in the controller 130, to a synchronization controlling unit 124 that controls the synchronization processing.

In response to receiving the counter request from the backend processing unit 123, the synchronization controlling unit 124 generates information for obtaining a synchronization control counter 131$b$ (Step S102). The synchronization controlling unit 124 then sends the generated information to the controller 130 (Step S103; refer to (i) in FIG. 5). For example, the synchronization controlling unit 124 may generate a command in accordance with the Simple Network Management Protocol (SNMP), and send the command.

The synchronization controlling unit 124 then waits to receive a synchronization control counter 131$b$ from the controller 130 (Steps S104 and No from S104). In response to receiving a synchronization control counter 131$b$ (Yes from Step S104), the synchronization controlling unit 124 passes the received synchronization control counter 131$b$ to the backend processing unit 123.

Figure 6:
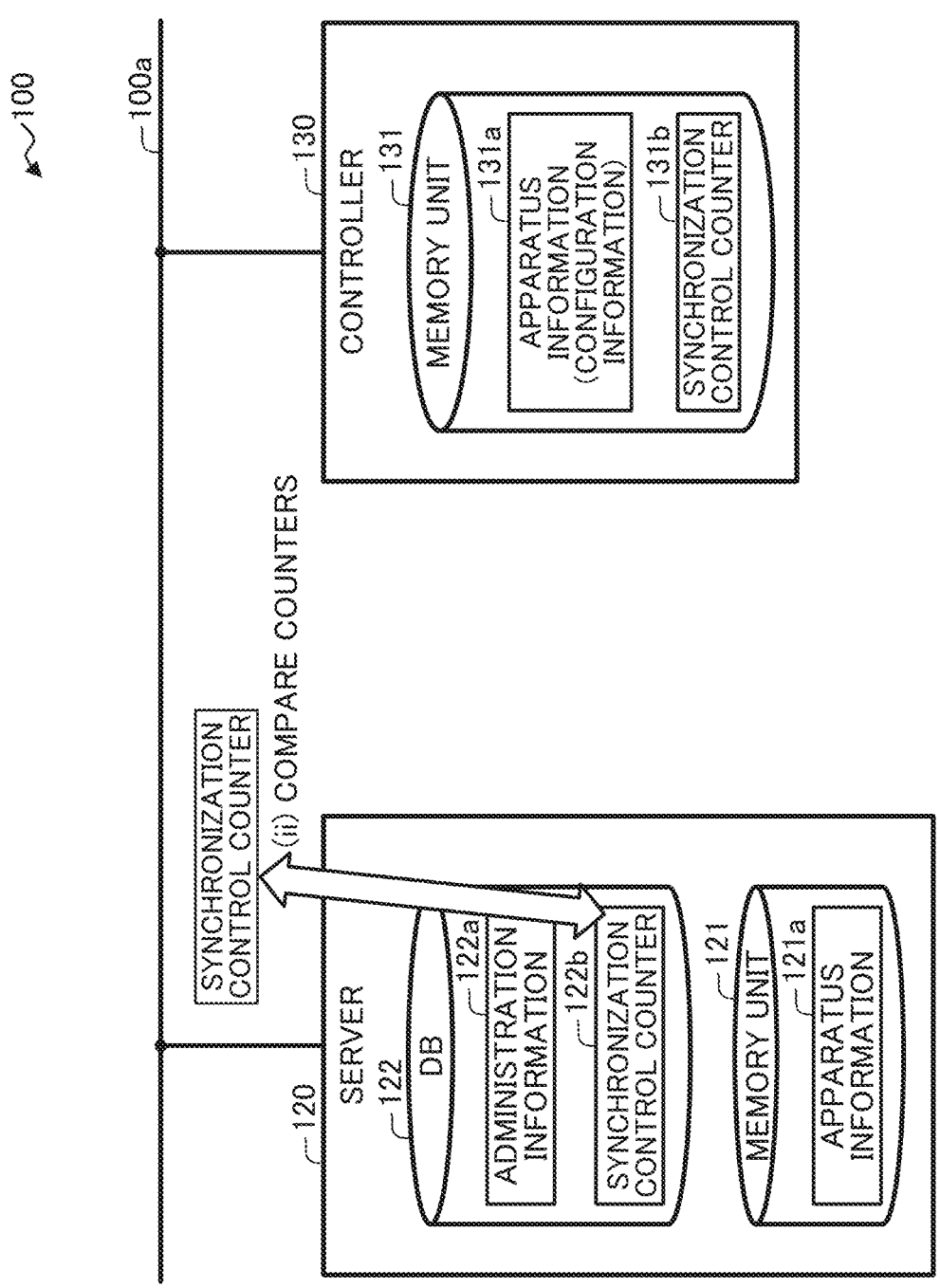
FIG. 6 is a diagram illustrating the operations of the synchronization processing depicted in FIG. 4.
Figure 7:
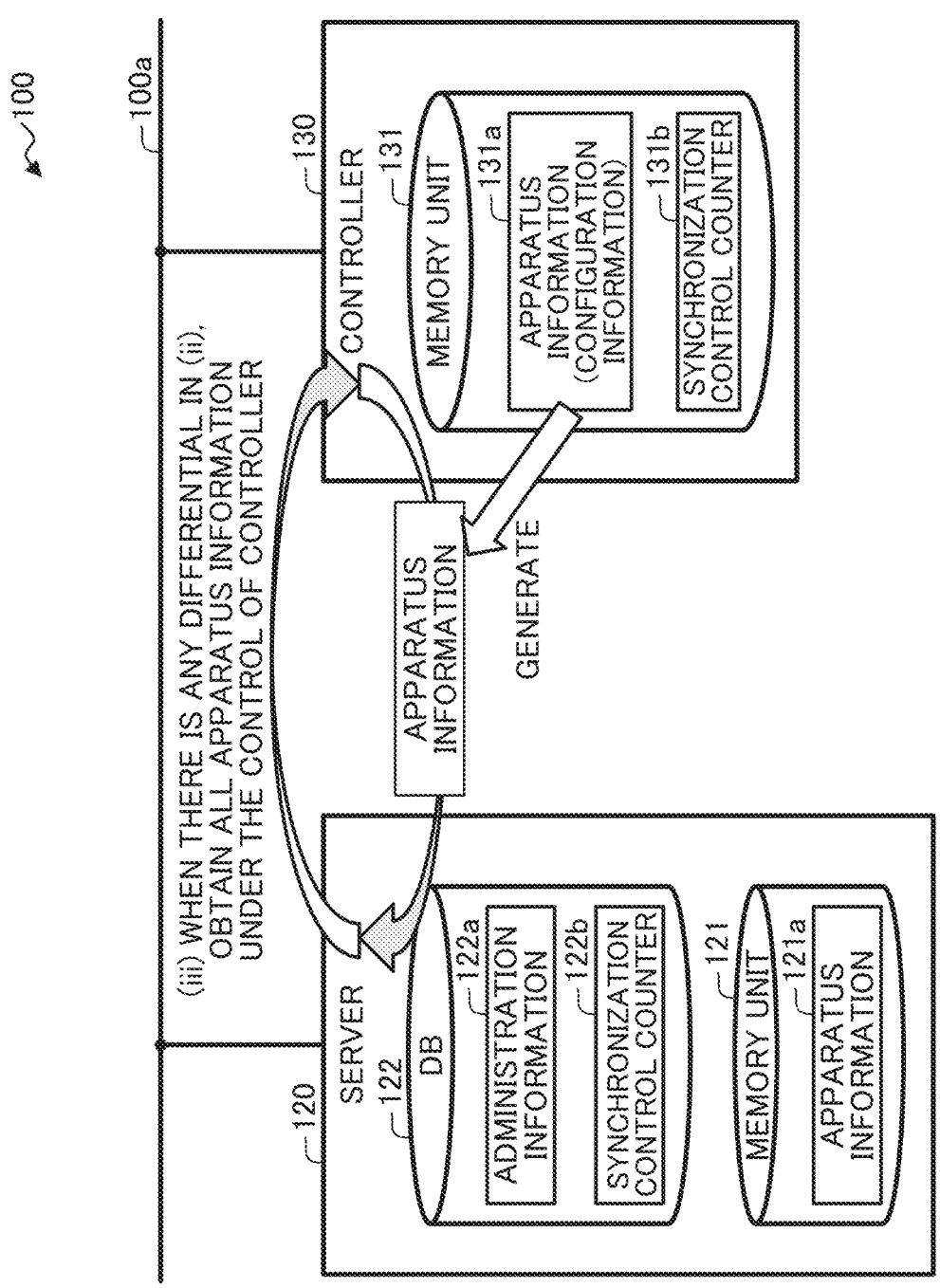
FIG. 7 is a diagram illustrating the operations of the synchronization processing depicted in FIG. 4.

The backend processing unit 123 determines whether or not the received synchronization control counter 131$b$ matches a synchronization control counter 122$b$ that was obtained previously and is stored in the DB 122 in the server 120 (Step S105; refer to (ii) in FIG. 6).

If the synchronization control counters 122$b$ and 131$b$ match (Yes from Step S105), the processing ends. Otherwise, if the synchronization control counters 122$b$ and 131$b$ do not match (No from Step S105), the backend processing unit 123 issues an obtainment request for obtaining all apparatus information 131$a$ of the storage apparatus 150, to the synchronization controlling unit 124.

In response to receiving the obtainment request from the backend processing unit 123, the synchronization controlling unit 124 identifies the model of the storage apparatus 150, and generates information (e.g., command) for obtaining apparatus information 131$a$ in accordance with the identified model (Step S106).

The generated information is passed to a maintenance and inquiry control command (MICC) 125 that controls the communication interfaces (IFs) with the controller 130. The MICC 125 sends the information passed from the synchronization controlling unit 124 to the network 100$a$ (the controller 130) via a framework of a particular protocol (Step S107; refer to (iii) in FIG. 7).

The MICC 125 then waits to receive apparatus information 131$a$ from the controller 130 (Step S108 and No from S108). In response to receiving apparatus information 131$a$ (Yes from Step S108), the MICC 125 passes the received apparatus information 131$a$ to the backend processing unit 123 via the synchronization controlling unit 124.

The backend processing unit 123 requests the synchronization controlling unit 124 to update a repository based on the received apparatus information 131$a$.

In this example, the server 120 stores and manages apparatus information 131$a$ of the storage apparatus 150 in the DB 122. The DB 122 is one example of a repository, and the DB 122 may be a database management system, such as Postgre SQL, for example. Note that in FIG. 1, the apparatus information managed as a repository is referred to as "administration information 122$a$".

Figure 8:
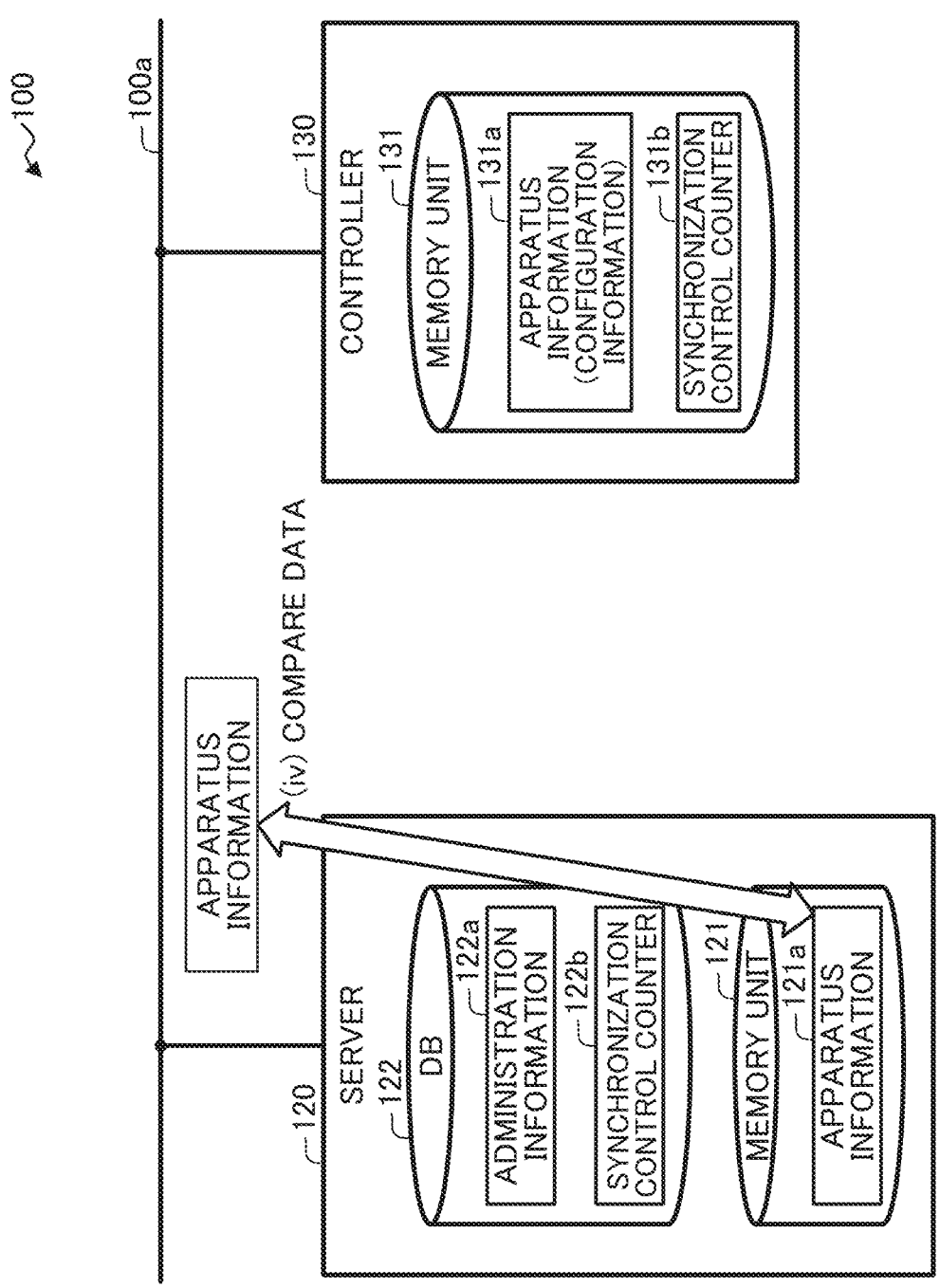
FIG. 8 is a diagram illustrating the operations of the synchronization processing depicted in FIG. 4.

The synchronization controlling unit 124 compares the apparatus information 131$a$ that is obtained currently, with apparatus information 121$a$ (refer to FIG. 1) that was obtained previously and is stored in a memory unit 121 (Step S109; refer to (iv) in FIG. 8).

Figure 9:
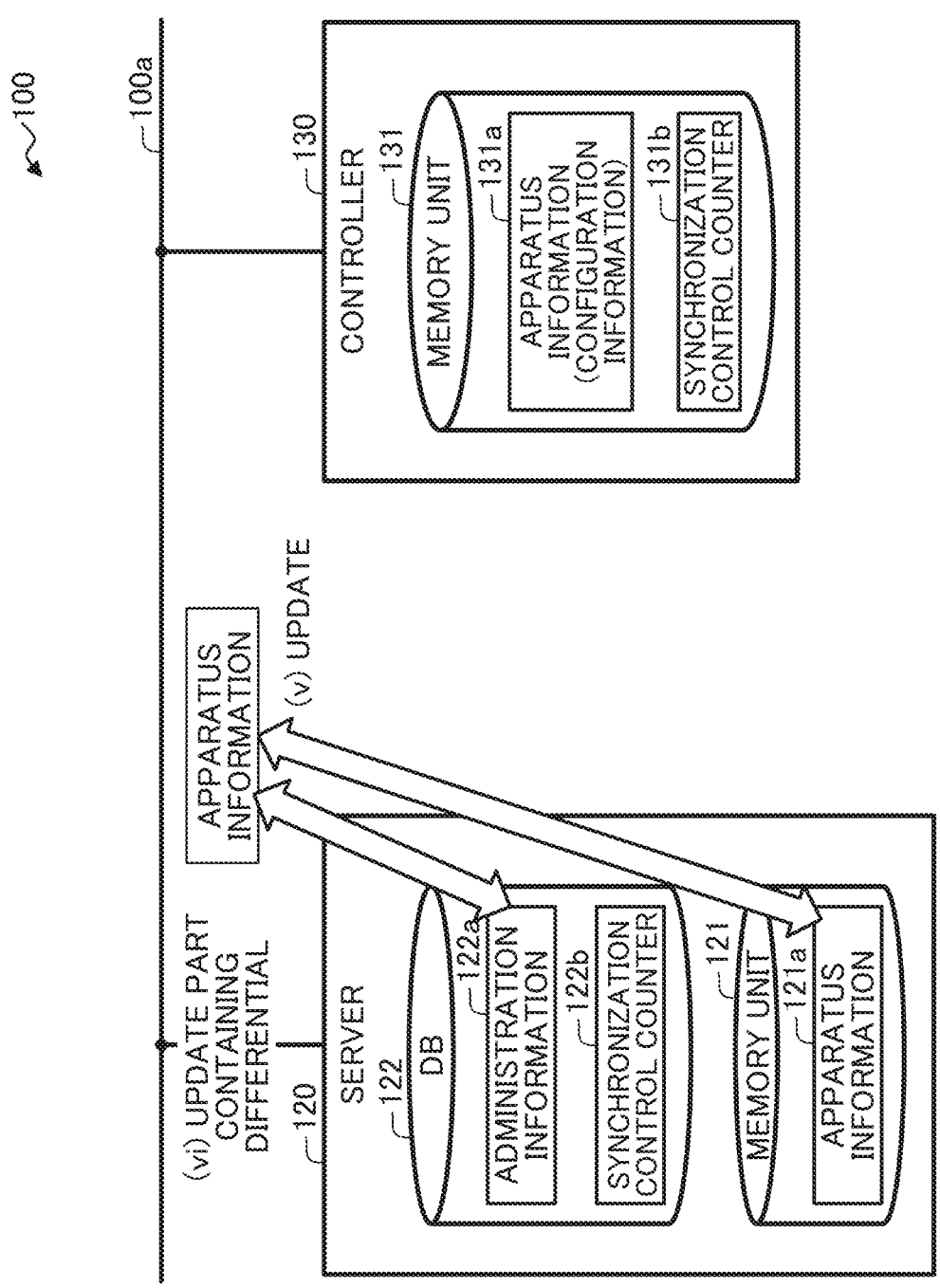
FIG. 9 is a diagram illustrating the operations of the synchronization processing depicted in FIG. 4.

After the synchronization controlling unit 124 completes the comparison, the synchronization controlling unit 124 overwrites the apparatus information 121$a$ in the memory unit 121, with the currently-obtained apparatus information 131$a$ (refer to (v) in FIG. 9). The synchronization controlling unit 124 then updates a repository, i.e., the DB 122 (the administration information 122$a$), based on data containing differential (Step S110; refer to (vi) in FIG. 9), and the processing ends.

Figure 10:
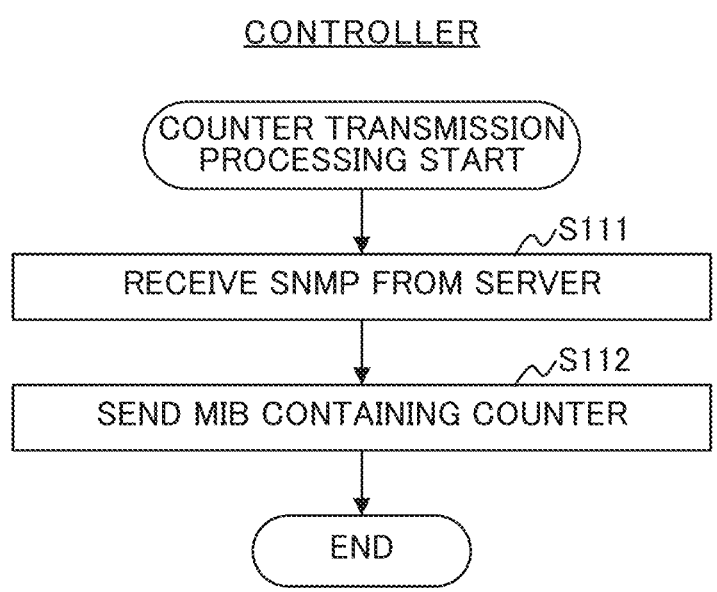
FIG. 10 is a flowchart illustrating operations of counter transmission processing in accordance with the comparative example.

For example, as depicted in FIG. 10, in response to receiving a command compliant with the SNMP containing a counter request, from the server 120 (Step S111), the firmware 132 in the controller 130 sends a response containing the counter to the server 120 (Step S112). An example of such a response includes a management information base (MIB) that is one example of administration information referenced to in the SNMP, for example.

Figure 11:
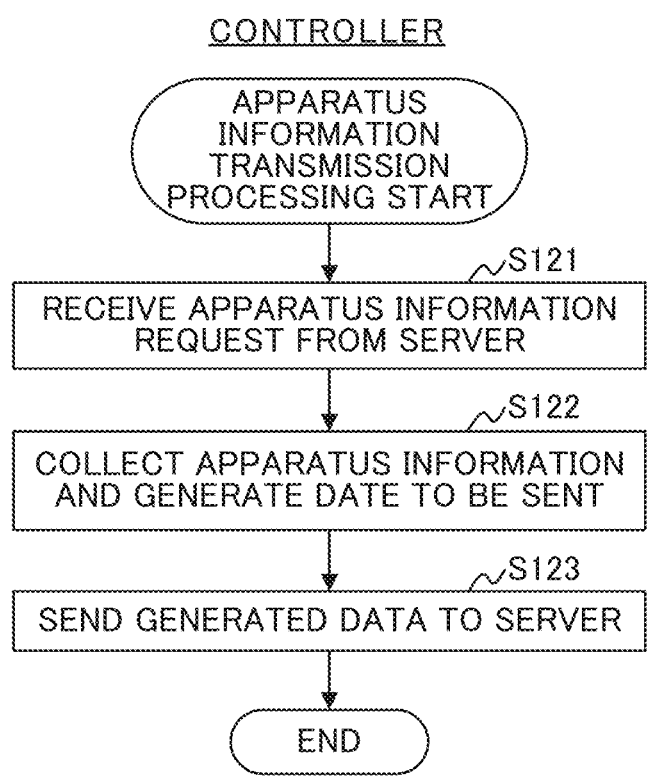
FIG. 11 is a flowchart illustrating operations of apparatus information transmission processing in accordance with the comparative example.

Further, for example, as depicted in FIG. 11, in response to receiving an apparatus information request from the server 120 (Step S121), the firmware 132 collects apparatus information 131$a$, and generates data to be sent (Step S122). The firmware 132 then sends the generated data to the server 120 (Step S123).

As described above, in cases where a large-scale storage apparatus, e.g., a scale-out storage apparatus, is employed as the storage apparatus 150 in the storage system 100 in accordance with the comparative example, synchronizations of apparatus information 131$a$ may come inefficient.

In order to address this issue, in the following one embodiment, a technique will be described, which achieves efficient synchronizations of apparatus information on a storage apparatus between a storage management apparatus and a storage controller.

Figure 12:
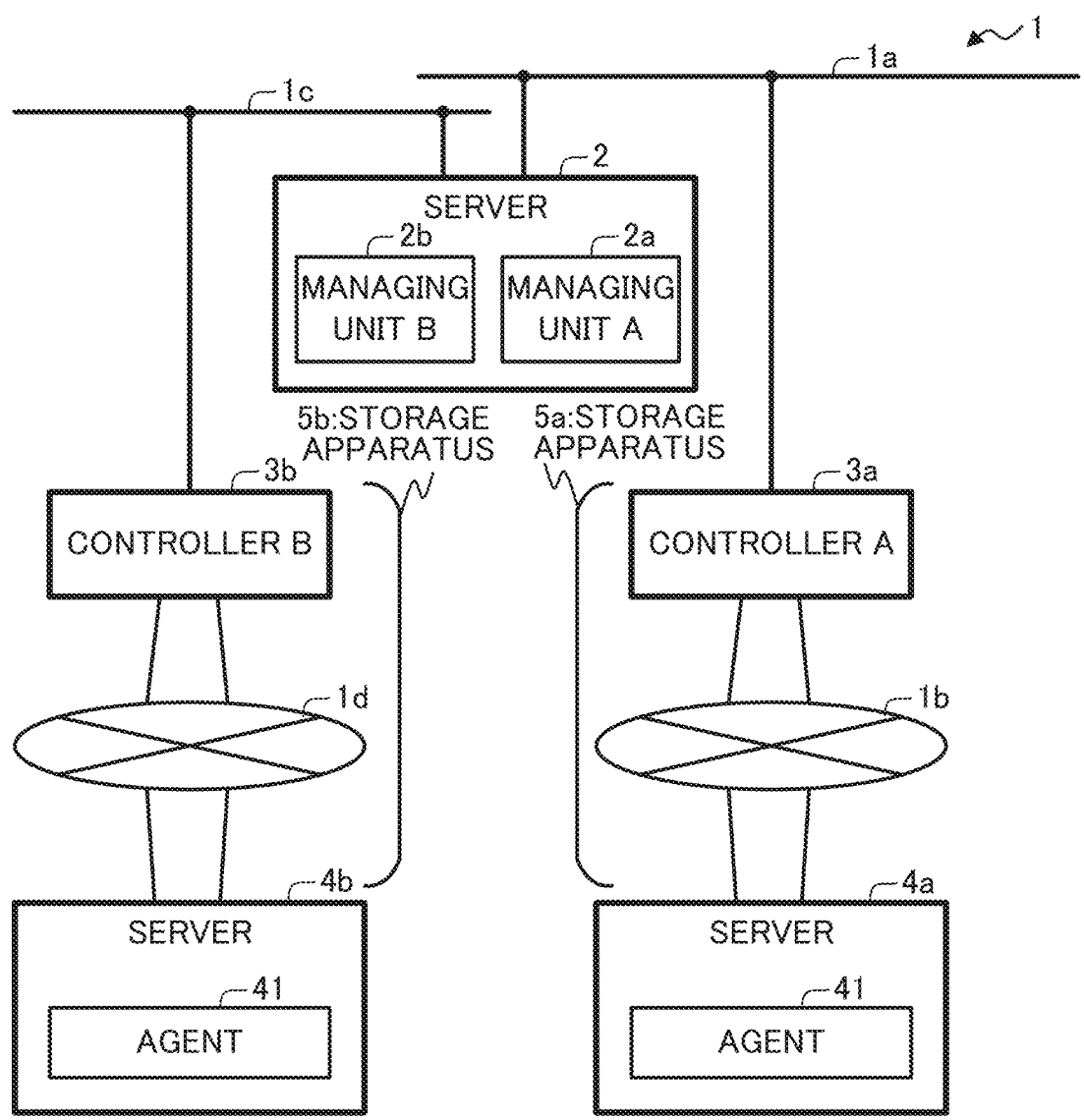
FIG. 12 is a block diagram depicting an example of a configuration of a storage system in accordance with one embodiment.

(1-2) Example of Configuration of Storage System in Accordance with One Embodiment As depicted in FIG. 12, a storage system 1 in accordance with one embodiment may include a server 2, controllers 3$a$ and 3$b$, and servers 4$a$ and 4$b$, for example. Note that block diagrams in FIG. 12 exemplify functional blocks, when focusing on synchronization processing of apparatus information, and other functional blocks, such as those used for operations related to business operations of the storage system 1, are omitted.

The server 2 is one example of a storage management apparatus. The server 2 is communicatively connected to each other to the controller 3$a$ via a network 1$a$, such as a LAN, and is also communicatively connected to each other to the controller 3$b$ via a network 1$c$, such as a LAN.

The controller (first controller) 3$a$ is one example of a storage controller configured to control the storage apparatus (first storage apparatus) 5$a$. The controller (second controller) 3$b$ is one example of a storage controller configured to control the storage apparatus (second storage apparatus) 5$b$. In one embodiment, the storage apparatus 5$a$ may be a scale-out storage apparatus, to which storages (storing apparatuses including storing areas; not illustrated) can be added, for example. On the contrary, in one embodiment, the storage apparatus 5$b$ may be a storage apparatus similar to the storage apparatus 150 in accordance with the comparative example depicted in FIG. 1.

Thus, the server 2 may include managing units 2$a$ and 2$b$ that manage the storage apparatuses 5$a$ and 5$b$ having different product specifications associated with the apparatus scale, in other words, of different types (models). Note that the storage system 1 may include multiple storage apparatuses 5a, and may be configured without the storage apparatus 5b.

In the following descriptions, when a reference is made to a unit or functional block related to the scale-out storage apparatus 5a, the name of the unit or functional block followed by the letter "A" is used in place of the reference symbol thereof. On the contrary, when a reference is made to a unit or functional block related to the storage apparatus 5b similar to that in the comparative example, the name of the unit or functional block followed by the letter "B" is used in place of the reference symbol thereof. As used therein, the term "unit or functional block related to the storage apparatuses 5" may mean that that unit or functional block may be included in the storage apparatuses 5, or that unit or functional block may process the storage apparatuses 5.

Hereinafter, when no distinction is made between the controllers 3a and 3b, they are simply referred to as "controllers 3". When no distinction is made between the servers 4a and 4b, they are simply referred to as "servers 4". When no distinction is made between the storage apparatuses 5a and 5b, they are simply referred to as "storage apparatuses 5".

The controller 3a provides the server 4a with storing areas in the storage apparatus 5a via a network 1b, such as the SAN. The controller 3b provides the server 4b with storing areas in the storage apparatus 5b via a network 1d, such as the SAN. Although storages (storing apparatuses having storing areas) provided in the storage apparatuses 5 are not illustrated in FIG. 12, the storage apparatuses 5 may include multiple storages connected to the storage apparatuses 5 via the respective network 1b and 1d or the like, for example.

Each server 4 is one example of a business server configured to include an agent 41, and access to the storage apparatus 5 via the agent 41. For example, the server 4a may be communicatively connected to each other to the controller 3a via the network 1b, such as the SAN, and the server 4b may be communicatively connected to each other to the controller 3b via the network 1d, such as the SAN.

(1-2-1) Example of Configuration of Server

Figure 13:
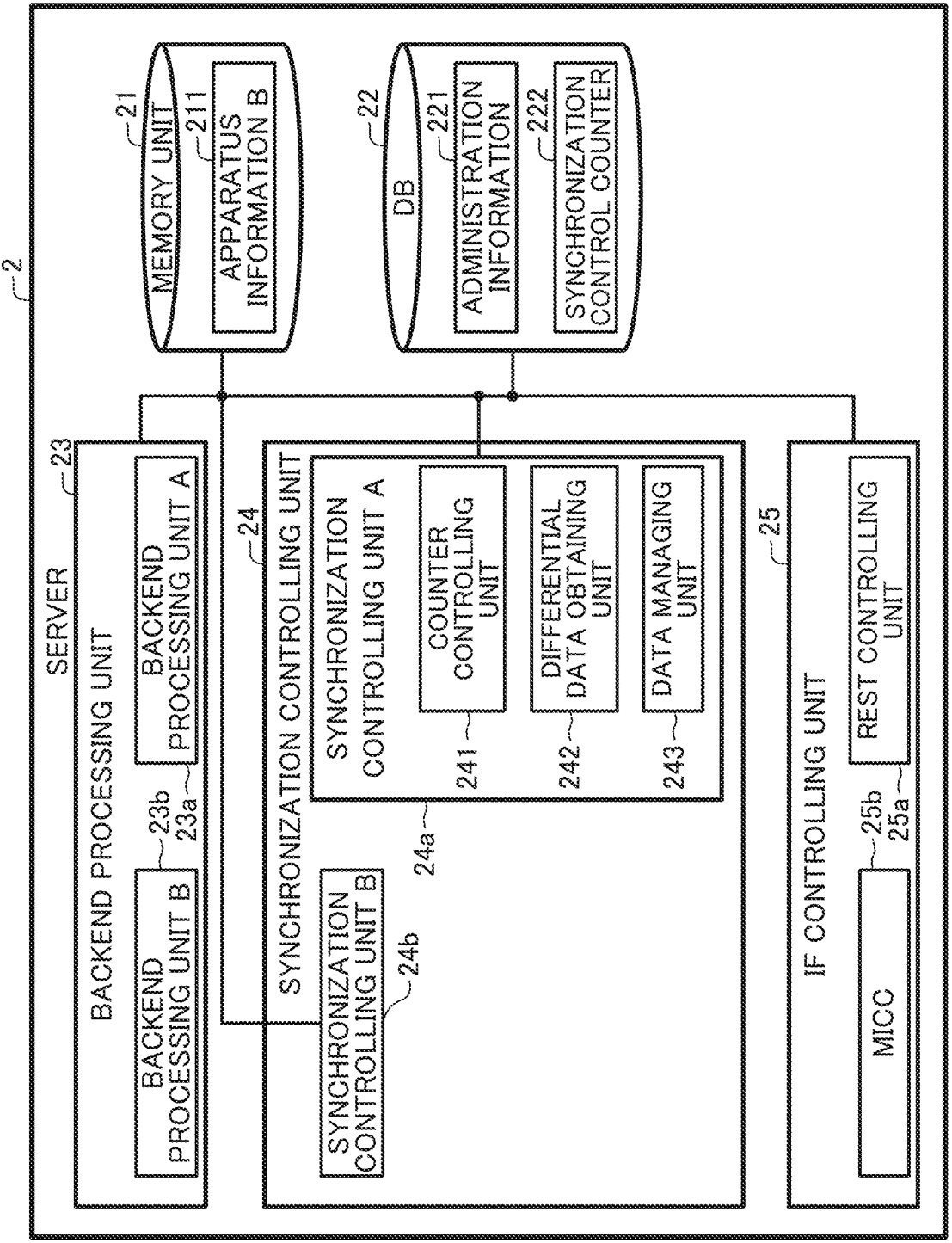
FIG. 13 is a block diagram depicting an example of a functional configuration of a server in accordance with one embodiment.

As depicted in FIG. 13, the server 2 as one example of the storage management apparatus may include a memory unit 21, a DB 22, a backend processing unit 23, a synchronization controlling unit 24, and an IF controlling unit 25, for example, when focusing on the functions to carry out the synchronization processing in accordance with one embodiment.

The memory unit 21 may store apparatus information 211. The apparatus information 211 is comparative apparatus information B (refer to (iv) in FIG. 8) used to determine whether or not there is any difference from all apparatus information obtained from the apparatus information 3b, in synchronization processing with the storage apparatus 5b. The apparatus information 211 may have the data configuration as exemplified in FIG. 2. When the storage system 1 includes no storage apparatus 5b, the apparatus information 211, as well as the memory unit 21, may be omitted.

In other words, the memory unit 21 is one example of a retaining unit configured to store configuration information regarding the configuration of the second storage apparatus 5b having the product specification associated with the apparatus scale different from that of the first storage apparatus 5a. In place of the memory unit 21, the DB 22 may be used to store the apparatus information 211 as one example of configuration information. In this case, the DB 22 is one example of the retaining unit.

The memory unit 21 may be embodied by storing areas, such as volatile memories, storing apparatuses, and flash memories. One example of the volatile memories is random access memories (RAMs), for example. Examples of the storing apparatuses include magnetic disk apparatuses, such as hard disk drives (HDDs), and solid state drive apparatuses, such as solid state drives (SSDs), for example.

The DB 22 is one example of a repository, and the DB 22 may be a database management system, such as Postgre SQL, for example. In FIG. 13, the apparatus information managed as a repository is referred to as "administration information 221". The administration information 221 depicted in FIG. 13 may have a data structure similar to that of apparatus information 311 stored in the controller 3a, which will be described later. Note that the DB 22 may store, as the repository, management tables particular to the server 2 for managing the storage apparatus 5a.

The DB 22 may be embodied by storing areas, such as volatile memories, storing apparatuses, and flash memories.

As depicted in FIG. 15, the administration information 221 and the apparatus information 311 may include multiple tables, including pool tables 221a and 311a, port tables 221b and 311b, and volume tables 221c and 311c, respectively, for example. The pool table 221a and 311a are tables used to manage information about pools, and the port tables 221b and 311b are tables used to manage information about ports. The volume tables 221c and 311c are tables used to manage information about volumes (storing areas).

In the administration information 221 and the apparatus information 311, information about the storage apparatus 5a is managed with the multiple tables. In other words, those tables are information (tables) that is provided by dividing the administration information 221 and the apparatus information 311 into small pieces in meaningful sizes (e.g., in the unit of parts or in the unit of logical information).

Hence, the controller 3a can select differential data to be sent to the server 2 on a table basis in synchronization processing. As a result, the processing loads on the server 2 can be mitigated, and data volumes to be communicated can be reduced.

As described above, the administration information 221 and the apparatus information 311 are examples of configuration information regarding the configuration of the storage apparatus 5a, the configuration information including a plurality of information elements.

In addition, the DB 22 stores a synchronization control counter 222 that is used in a synchronization control in accordance with one embodiment. The synchronization control counter 222 is a comparative counter, which was obtained previously from the storage apparatus 5a, and may have a data structure similar to that of a synchronization control counter 312, which will be described later, stored in the controller 3a. Note that the DB 22 may further store the synchronization control counter 122b as exemplified in FIG. 1, for a synchronization control on the storage apparatus 5b.

As depicted in FIG. 16, the synchronization control counters 222 or 312 may contain information, including the serial number of a storage apparatus 5, a representative counter 222a or 312a, a pool counter, a port counter, a volume counter, for example. Note that multiple volume counters, such as a volume counter (0-1000) and a volume counter (1001-yyyy), may be provided for each range of volumes.

Here, counters, including the pool counter, the port counter, the volume counter (0-1000), and the volume counter (1001-yyyy), are examples of the individual counters 222b or 312b.

In other words, the individual counters 222b and 312b are counters that are provided for each piece of the information (tables) derived by dividing the administration information 221 and the apparatus information 311 into small pieces in meaningful sizes (e.g., in the unit of parts or in the unit of logical information), respectively. More specifically, those counters correspond to the multiple tables in the administration information 221 or the apparatus information 311. For example, the pool counter corresponds to the pool table 221a or 311a, the port counter corresponds to the port table 221b or 311b, and the volume counter correspond to the volume table 221c or 311c.

Note that, as the volume counter, multiple counters may be provided, for each of ranges of corresponding (controlling) entry ("name" or "id") in the volume table 221c or 311c. For example, the volume counter (0-1000) may correspond to the range from "volume 0" to "volume 1000" in the volume table 221c or 311c. The volume counter (1001-yyyy) may correspond to the range from "volume 1001" to "volume yyyy" in the volume table 221c or 311c.

The individual counters 222b or 312b may be controlled such that their counter values are modified (e.g., incremented) when information in the range of the corresponding (controlling) table or entry is updated in the controller 3a.

In contrast, the representative counter 222a or 312a may be controlled such that its counter value is modified (e.g., incremented) when one or more counter values of the individual counters 222b or 312b are modified. In other words, the representative counter 222a or 312a is a counter, the counter value of which is modified every time the apparatus information 311 is updated in the controller 3a. Further, each individual counter 222b or 312b is a counter, the counter value of which is modified every time the corresponding table in the apparatus information 311 is updated in the controller 3a. The representative counter 222a or 312a may be controlled such that the counter value of the representative counter 222a or 312a equals the sum of the counter values of all of the individual counters 222b or 312b.

As described above, the representative counter 222a or 312a is one example of first update information indicating the update status of the apparatus information 311 by the controller 3a. In addition, a plurality of the individual counters 222b or 312b are examples of a plurality of second update information pieces indicating the respective update statuses of the plurality of information elements in the apparatus information 311 by the controller 3a.

As set forth above, the synchronization control counter 222 stored in the server 2 is a counter that was received previously from the controller 3a. Accordingly, it can be regarded that the counter values of the representative counter 222a and the individual counters 222b in the synchronization control counter 222 indicate the update status of the apparatus information 311 at the time when the apparatus information 311 was received previously (the apparatus information 311 was sent from the controller 3a previously).

Accordingly, the DB 22 is one example of a storing unit configured to store configuration information, first update information indicating the update status of the configuration information, and a plurality of second update information pieces indicating respective update statuses of the plurality of information elements in the configuration information.

The backend processing unit 23 carries out processing as a backend for synchronization processing (e.g., a scheduler) in the server 2. The backend processing unit 23 may include a backend processing unit 23a that carries out processing on the storage apparatus 5a (the controller 3a), and a backend processing unit 23b that carries out processing on the storage apparatus 5b (the controller 3b), for example. The processing by the backend processing unit 23b may be similar to the one by the backend processing unit 123 exemplified in FIG. 1.

The backend processing unit 23a carries out adjustments as to when to initiate synchronization processing (e.g., controls to activate a synchronization controlling unit 24a at constant time intervals), comparisons between the synchronization control counter 222 and the synchronization control counter 312, and the like.

Here, in one embodiment, the backend processing unit 23a compares the representative counter 222a in the synchronization control counter 222, with the representative counter 312a in the synchronization control counter 312.

The synchronization controlling unit 24 controls synchronization processing on the storage apparatuses 5 (the controllers 3). The synchronization controlling unit 24 may include a synchronization controlling unit 24a that controls synchronization processing on the storage apparatus 5a (the controller 3a), and a synchronization controlling unit 24b that controls the synchronization processing on the storage apparatus 5b (the controller 3b), for example. The control by the synchronization controlling unit 24b may be similar to the one by the synchronization controlling unit 124 exemplified in FIG. 1.

The synchronization controlling unit 24a may include a counter controlling unit 241, a differential data obtaining unit 242, and a data managing unit 243, for example.

The counter controlling unit 241 manages the synchronization control counter 222, obtains the synchronization control counter 312 from the controller 3a, updates the synchronization control counter 222 with the obtained synchronization control counter 312, and carries out other processing.

The differential data obtaining unit 242 obtains differential data from the controller 3a if the representative counters 222a and 312a do not match in a comparison between the representative counters 222a and 312a by the backend processing unit 23a (if there is any difference between the representative counters 222a and 312a).

The data managing unit 243 reflects the differential data obtained from the controller 3a, into a repository, e.g., the administration information 221 in a DB 31.

The IF controlling unit 25 controls a communication IF with the controllers 3. The IF controlling unit 25 may include a representational state transfer (REST) controlling unit 25a that controls a communication IF with the controller 3a, and an MICC 25b that controls a communication IF with the controller 3b, for example. The control by the MICC 25b may be similar to the one by the MICC 125 exemplified in FIG. 1.

The REST controlling unit 25a controls communications with the controller 3a via a framework of the REST.

As described above, in the server 2, the DB 22, the backend processing unit 23a, the synchronization controlling unit 24a, and the REST controlling unit 25a are examples of the managing unit 2a depicted in FIG. 12. In addition, the memory unit 21, (the DB 22,) the backend processing unit 23b, the synchronization controlling unit 24b, and the MICC 25b are examples of the managing unit 2b depicted in FIG. 12.

(1-2-2) Example of Configuration of Controller A

Figure 14:
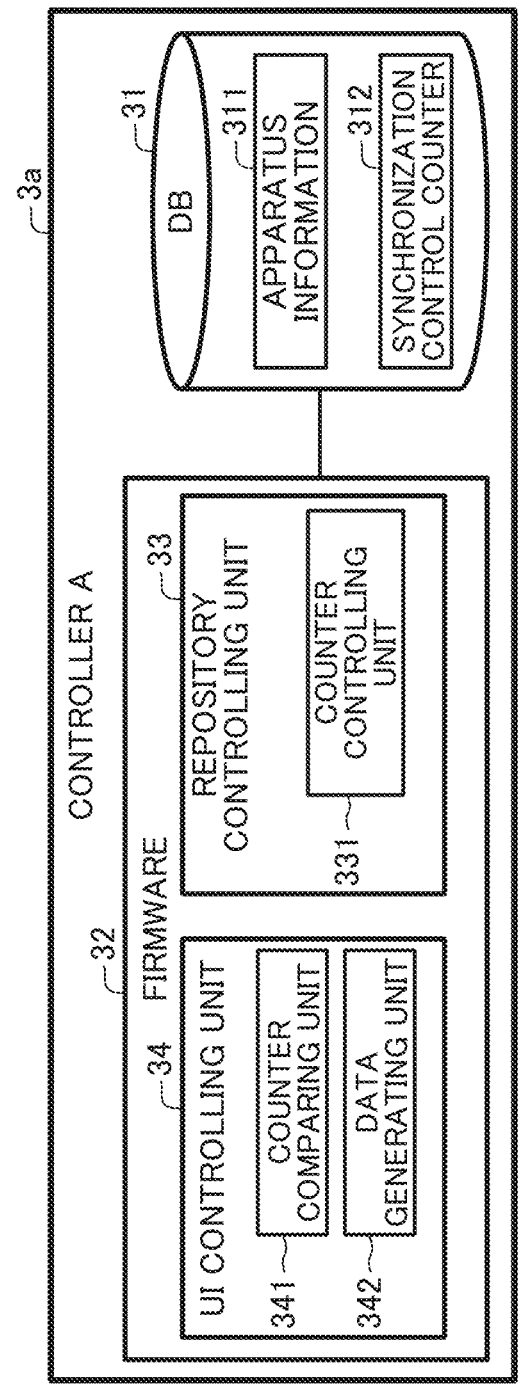
FIG. 14 is a block diagram depicting an example of a functional configuration of a controller in accordance with one embodiment.

As depicted in FIG. 14, the controller 3a (the controller A) in the storage apparatus 5a may include the DB 31 and firmware 32, for example.

The DB 31 is one example of a repository, and the DB 31 may be a database management system, such as Postgre SQL, for example. In FIG. 14, the apparatus information managed as a repository is referred to as "apparatus information" (or "configuration information") 311 (refer to FIG. 15). Note that the DB 31 may store, as a repository, control tables used for controlling the storage apparatus 5*a*.

The DB 31 also stores the synchronization control counter 312 (refer to FIG. 16) for carrying out the synchronization control in accordance with one embodiment.

The DB 31 may be embodied by storing areas, such as volatile memories, storing apparatuses, and flash memories.

The firmware 32 may include a repository controlling unit 33 and a user interface (UI) controlling unit 34, for example, when focusing on the functions to carry out synchronization processing in accordance with one embodiment.

The repository controlling unit 33 controls the DB 31 as a repository. For example, the repository controlling unit 33 updates the apparatus information 311 when the configuration information about the storage apparatus 5*a* is modified. Modifications to the configuration information about the storage apparatus 5*a* include modifications on connections among devices, modifications to settings of devices, modifications to configurations and settings of volumes (e.g., LUNs), information about failures and recovery of devices in the storage apparatus 5*a*, the state of the usage of volumes, and the like. LUN is an abbreviation for Logical Unit Number.

The repository controlling unit 33 may include a counter controlling unit 331. The counter controlling unit 331 updates, in response to the apparatus information 311 being updated by the repository controlling unit 33, the corresponding counters in the synchronization control counter 312, such as corresponding individual counters 312*b* and the representative counter 312*a*, for example. The details of the counter controlling unit 331 will be described later.

The UI controlling unit 34 carries out a UI controls for the server 2. As depicted in FIG. 14, the UI controlling unit 34 may include a counter comparing unit 341 and a data generating unit 342, for example.

The counter comparing unit 341 responds with the synchronization control counter 312 in response to a counter obtainment request from the server 2. In addition, in response to a differential data obtainment request from the server 2, the counter comparing unit 341 compares the individual counters 222*b* in the synchronization control counter 222 that is received from the server 2, with the individual counters 312*b* in the synchronization control counter 312 retained by the controller 3*a*.

Depending on the result of the comparison by the counter comparing unit 341, the data generating unit 342 extracts differential data (e.g., a table) associated with unmatched individual counters 222*b* and 312*b*, and generates response data to the differential data obtainment request.

(1-3) Example of Operations

Next, an example of operations by the storage system 1 configured as described above will be described, when focusing on synchronization processing with the storage apparatus 5*a* by the server 2.

(1-3-1) Configuration Information Modification Processing

Figure 17:
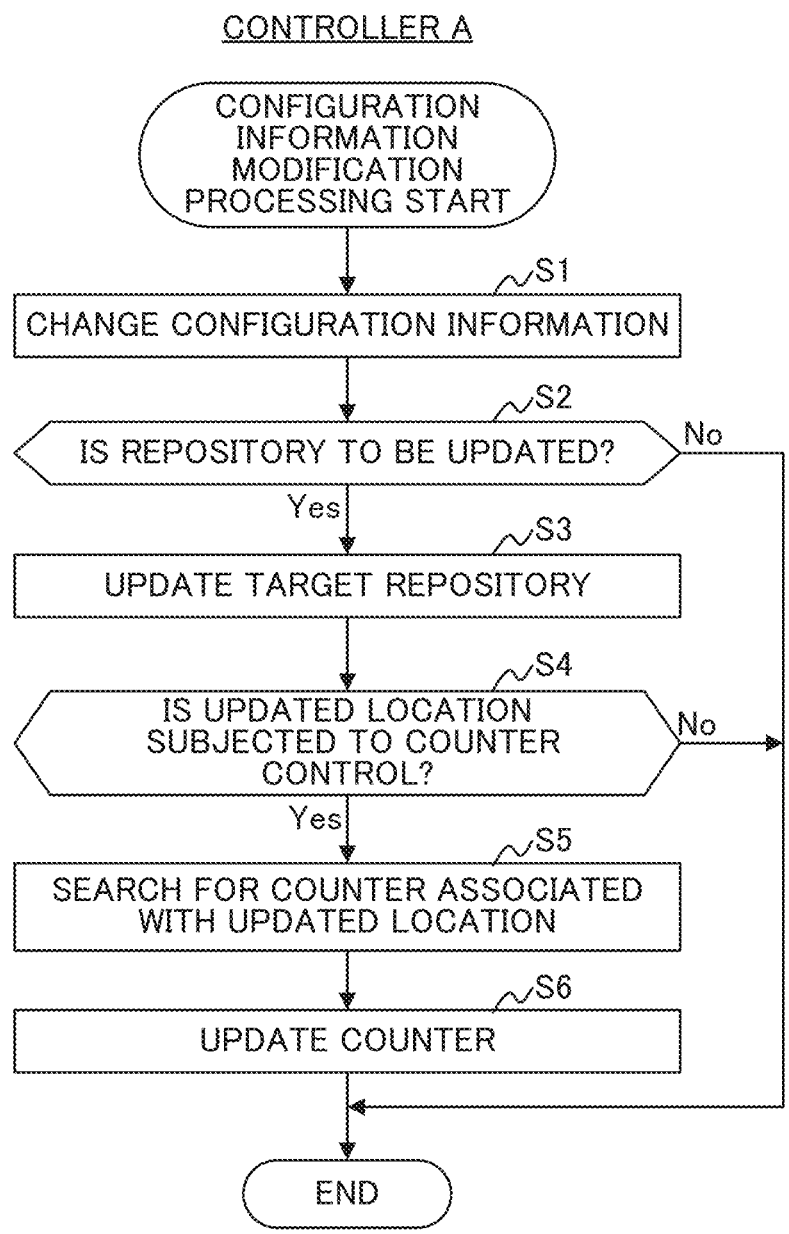
FIG. 17 is a flowchart illustrating an example of operations of configuration information modification processing in accordance with one embodiment.

Initially, referring to FIG. 17, an example of operations of modification processing of the apparatus information (configuration information) 311 in the controller 3*a* will be described. As depicted in FIG. 17, when a job operating on the controller 3*a*, e.g., an application creating a volume or modifying configuration information, modifies the configuration information on the storage apparatus 5*a* (Step S1), it is determined whether or not the repository (the DB 31) is to be updated (Step S2).

If the repository is not to be updated (No from Step S2), the processing ends. Otherwise, if the repository is to be updated (Yes from Step S2), the repository controlling unit 33 updates the target repository, e.g., a target table in the apparatus information 311 (Step S3).

The repository controlling unit 33 (e.g., the counter controlling unit 331) then determines whether or not the updated location in the apparatus information 311 is subjected to a counter control (Step S4). If the updated location is not subjected to a counter control (No from Step S4), the processing ends.

If the updated location is subjected to a counter control (Yes from Step S4), the counter controlling unit 331 searches for a counter associated with the updated location (Step S5). For example, the counter controlling unit 331 may look up the apparatus information 311 or control tables stored in the DB 31, or the like.

The counter controlling unit 331 then updates a found counter (the individual counter 312*b*) and the representative counter 312*a* (Step S6), and the processing ends.

As set forth above, in the controller 3*a*, because counters are divided into small pieces, a counter corresponding to an updated location is updated in the unit of the finely-divided counter when the repository is updated. Accordingly, a modification on the repository is identifiable in a small unit according to the segment size of the counter.

(1-3-2) Synchronization Processing

Next, referring to FIGS. 18-28, an example of operations of synchronization processing in the server 2 and the controller 3*a* will be described.

Figure 18:
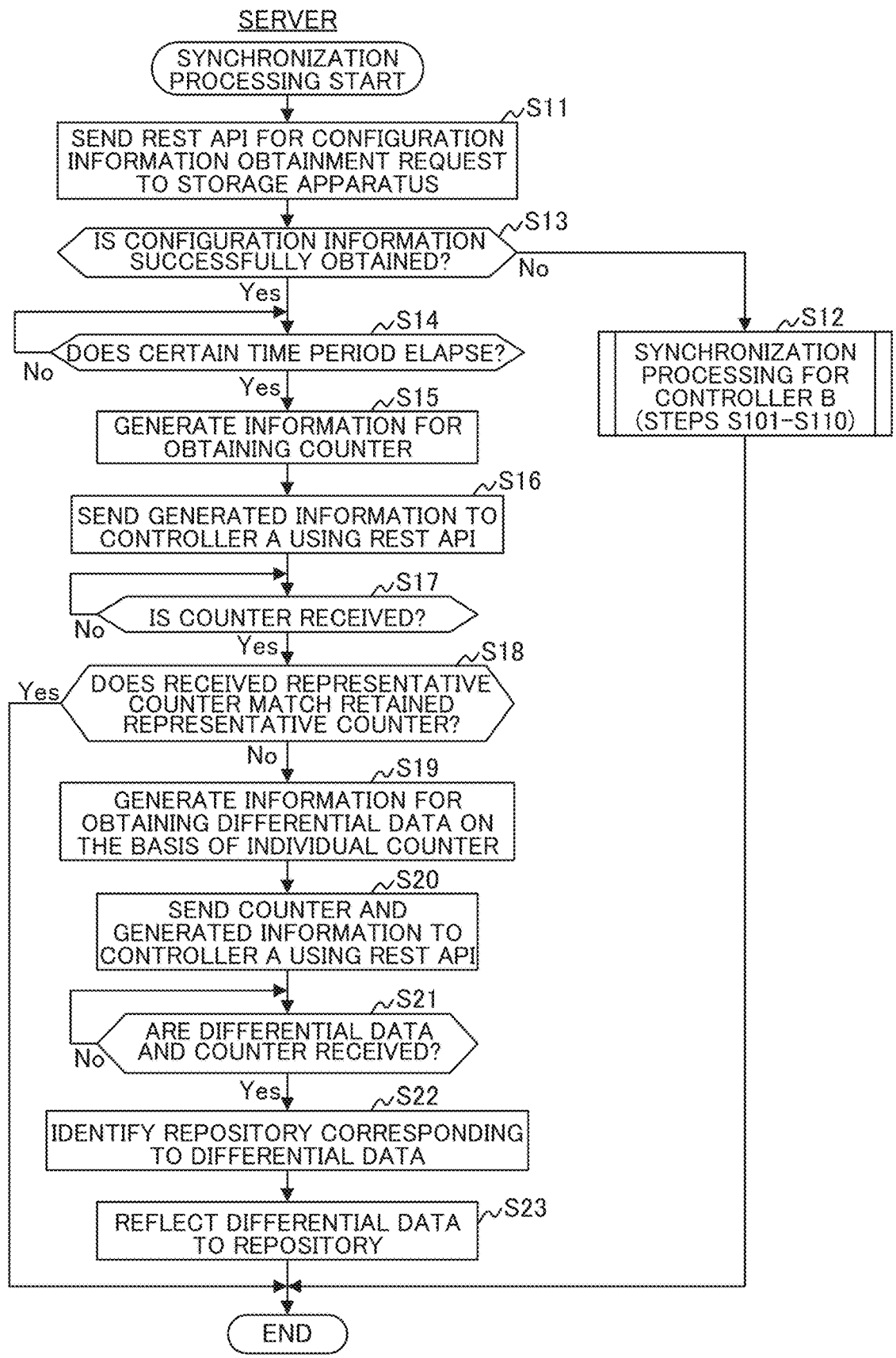
FIG. 18 is a flowchart illustrating an example of operations of synchronization processing in accordance with one embodiment.

As depicted in FIG. 18, in the server 2, the backend processing unit 23 issues a REST API for a configuration information obtainment request, to the storage apparatuses 5 (for example, to every storage apparatus 5 connected to the server 2). The REST controlling unit 25*a* sends the request to the storage apparatuses 5 via the network 1*a* through the framework of the REST (Step S11).

Figure 19:
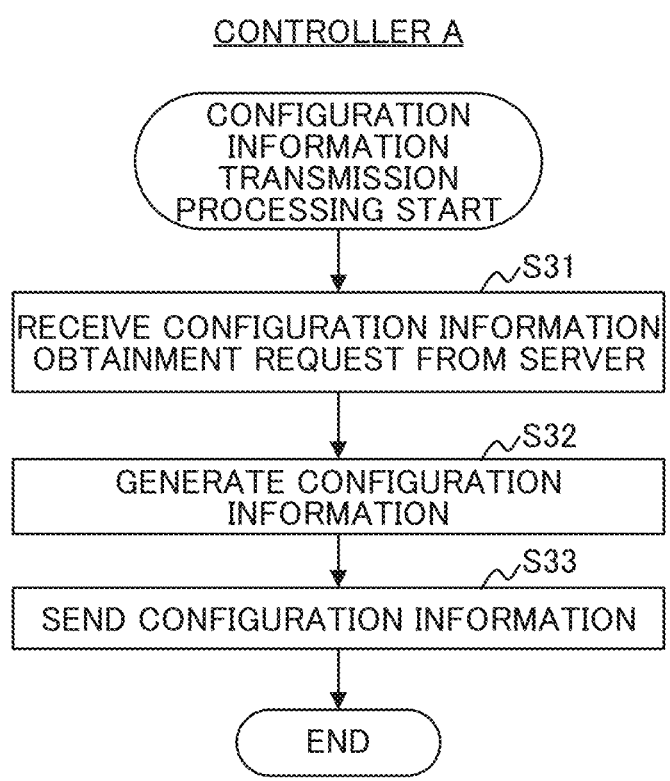
FIG. 19 is a flowchart illustrating an example of operations of configuration information transmission processing in accordance with one embodiment.
Figure 20:
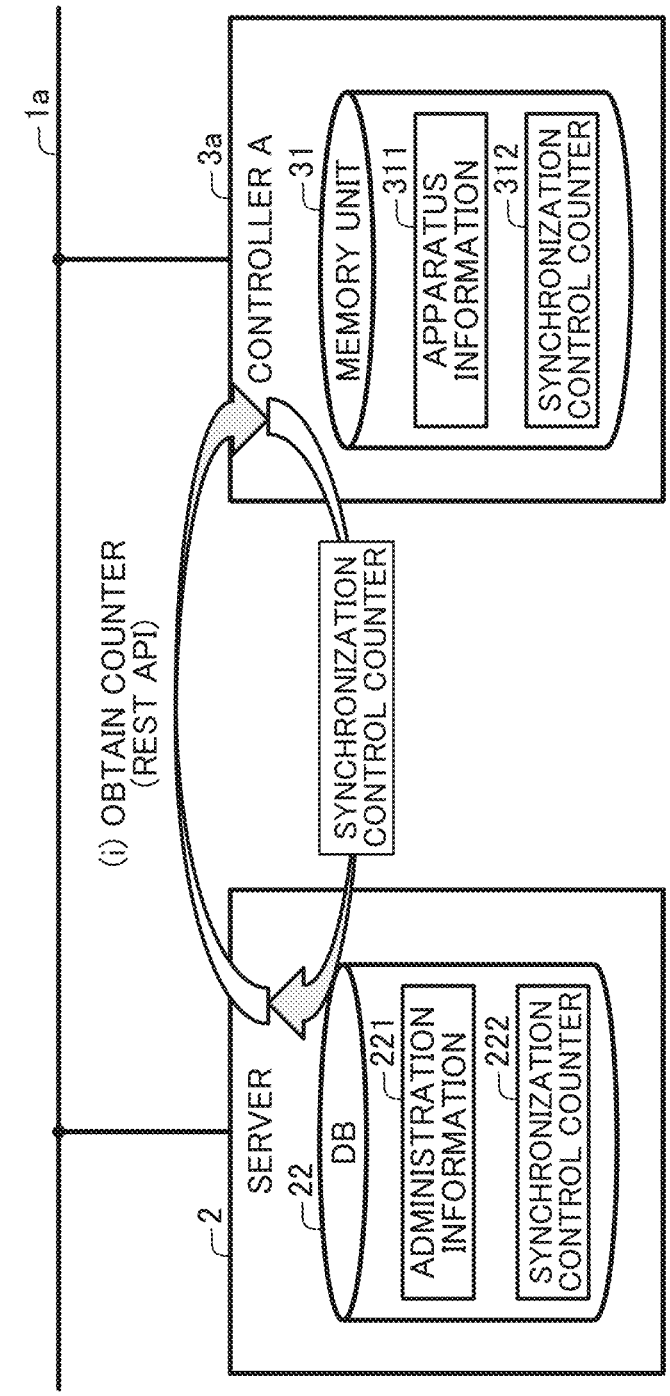
FIG. 20 is a diagram illustrating an example of operations of the synchronization processing depicted in FIG. 18.

As exemplified in FIG. 19, in configuration information transmission processing, in response to receiving the configuration information obtainment request from the server 2 (Step S31), the data generating unit 342 in the controller 3*a* generates configuration information to be sent (Step S32). The data generating unit 342 then sends the generated configuration information to the server 2 (Step S33). Note that the configuration information may be the apparatus information 311 at the time when the configuration information obtainment request is received.

Referring back to descriptions of FIG. 18, the backend processing unit 23 in the server 2 determines whether or not configuration information is obtained successfully from the controller 3 (Step S13). A failure in successfully receiving configuration information (No from Step S13) indicates that the controller 3, to which the configuration information obtainment request was sent, is the controller 3*b* in the storage apparatus 5*b* not supporting the REST.

Therefore, in this case, the backend processing unit 23 instructs the managing unit 2*b* to carry out synchronization processing for the controller B on the storage apparatus 5*b*, from which configuration information was not obtained successfully. The managing unit 2*b* carries out synchronization processing for the controller B (refer to Steps S101-S110 in FIG. 4) (Step S12), and the processing ends.

As set forth above, the backend processing unit 23 (23b) is one example of a controlling unit configured to prevent processing by the backend processing unit 23a, the synchronization controlling unit 24a, and the REST controlling unit 25a, which will be described later, from being executed in the controller 3b. The backend processing unit 23 (23b) as the controlling unit may obtain, from the controller 3b, apparatus information about the configuration of the storage apparatus 5b at certain timing (e.g., at constant time intervals), and may update the apparatus information 211 retained in the memory unit 21 based on the obtained apparatus information.

On the contrary, a successful obtainment of configuration information from the controller 3 (Yes from Step S13) indicates that the controller 3, to which the configuration information obtainment request is sent, is the controller 3a in the storage apparatus 5a supporting the REST.

In this case, the backend processing unit 23 instructs the managing unit 2a to carry out synchronization processing for the controller A on the storage apparatus 5a, from which configuration information was obtained successfully. As set forth above, the backend processing unit 23 is one example of a switching unit configured to switch between processing by the managing unit 2a and processing by the managing unit 2b (determines whether the processing by the managing unit 2a or the processing by the managing unit 2b is to be carried out), depending on the product specification associated with the apparatus scale. Hereinafter, processing by the managing unit 2a will be described.

The backend processing unit 23a waits until certain time period elapses (Step S14 and No from S14). When the certain time period elapses (Yes from Step S14), the backend processing unit 23a issues a counter request for obtaining the synchronization control counter 312 in the controller 3a, to the synchronization controlling unit 24a.

In response to receiving the counter request from the backend processing unit 23a, the synchronization controlling unit 24a generates information for obtaining the synchronization control counter 312 (Step S15). The synchronization controlling unit 24a also issues a REST API for sending the generated information. The REST controlling unit 25a sends the generated information to the controller 3a via the network 1a through the framework of the REST (Step S16; refer to (i) in FIG. 20).

Figure 21:
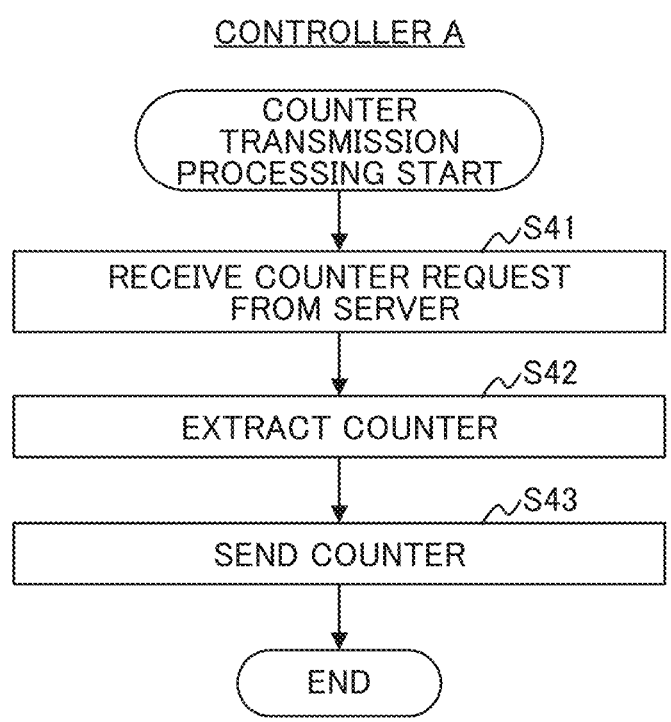
FIG. 21 is a flowchart illustrating an example of operations of counter transmission processing in accordance with one embodiment.
Figure 22:
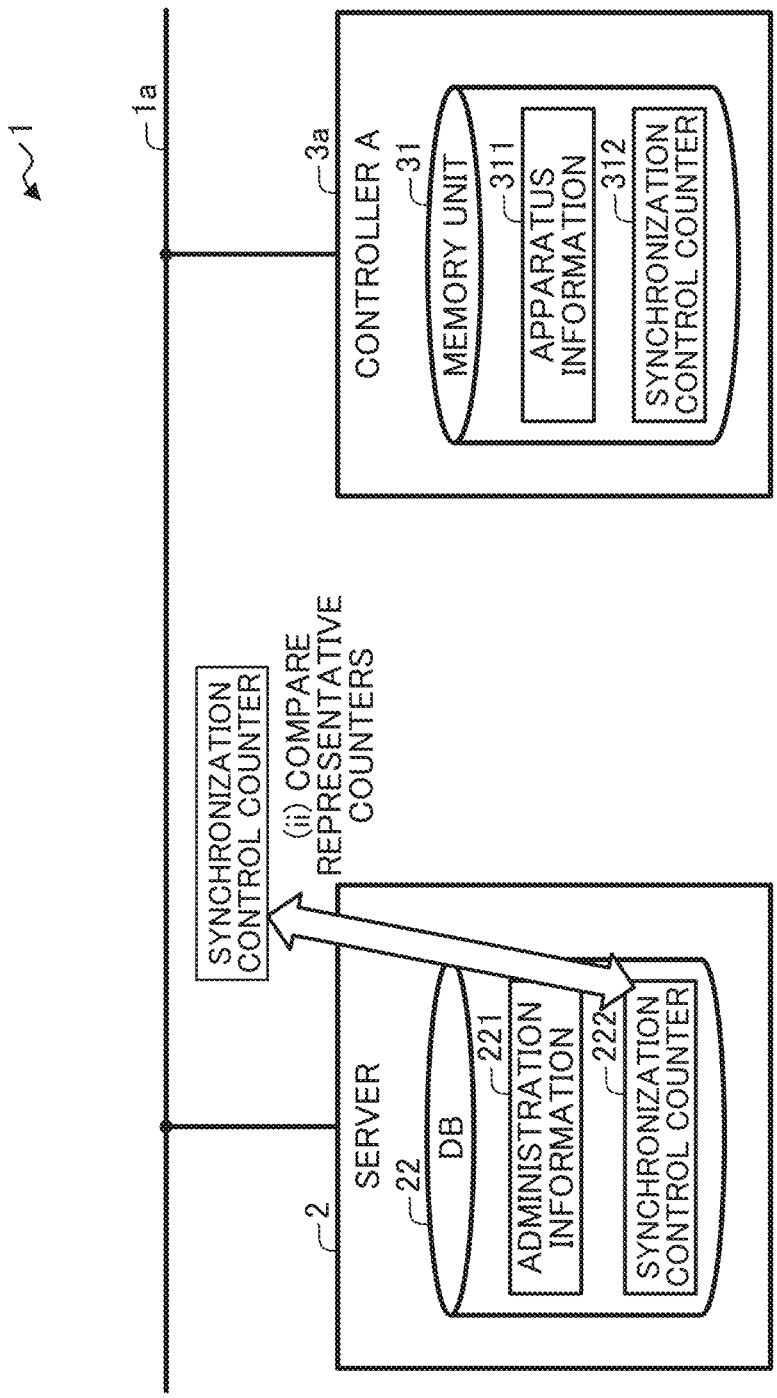
FIG. 22 is a diagram illustrating an example of operations of the synchronization processing depicted in FIG. 18.
Figure 23:
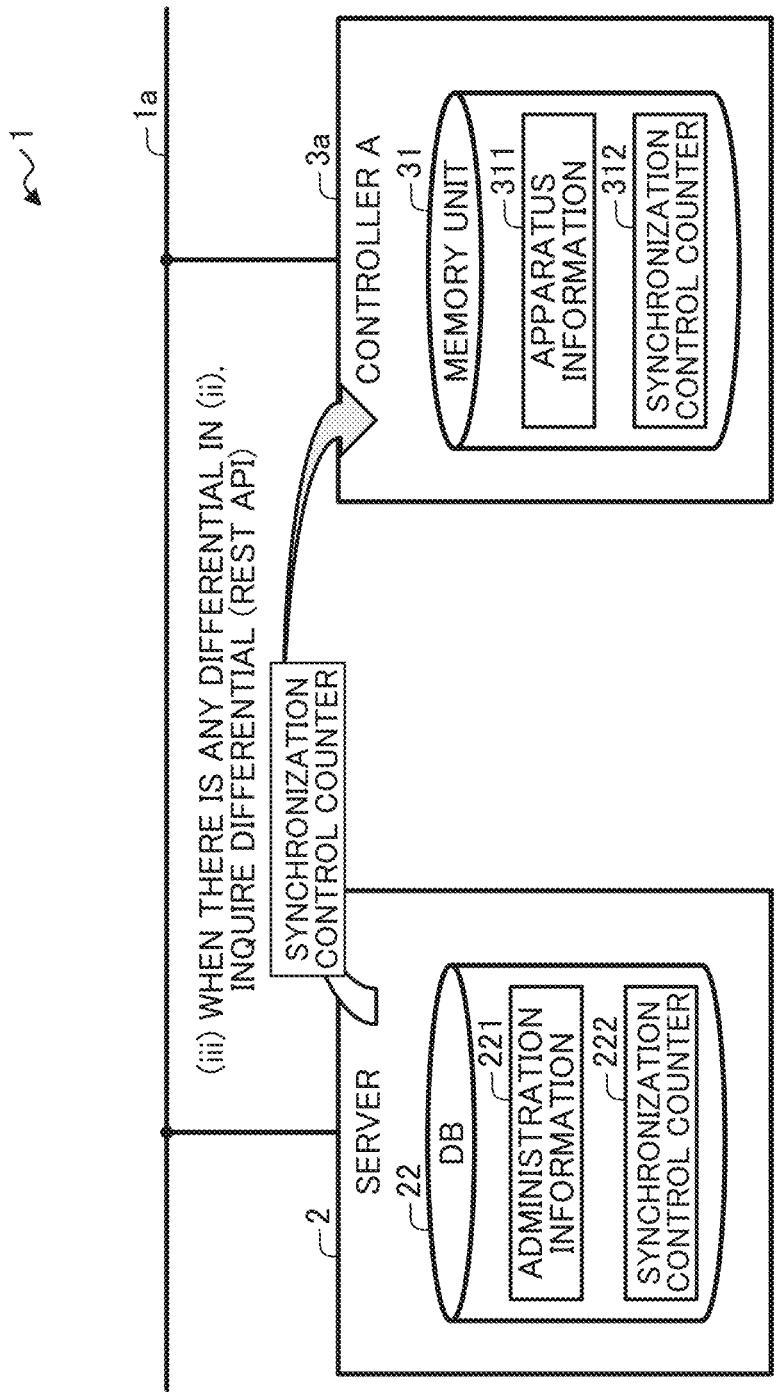
FIG. 23 is a diagram illustrating an example of operations of the synchronization processing depicted in FIG. 18.

As exemplified in FIG. 21, in counter transmission processing, in response to receiving the counter request from the server 2 (Step S41), the counter comparing unit 341 in the controller 3a extracts the synchronization control counter 312 to be sent, from the DB 31 (Step S42). The counter comparing unit 341 then sends the extracted synchronization control counter 312 to the server 2 (Step S43).

Referring back to descriptions of FIG. 18, the synchronization controlling unit 24a and the REST controlling unit 25a wait to receive the synchronization control counter 312 from the controller 3a (Step S17 and No from S17).

In response to the REST controlling unit 25a receiving a result of the request from the network 1a (Yes from Step S17), the counter controlling unit 241 in the synchronization controlling unit 24a passes the received synchronization control counter 312 to the backend processing unit 23a.

The backend processing unit 23a compares the received representative counter 312a in the synchronization control counter 312, with the representative counter 222a in the synchronization control counter 222 stored in the DB 22. The backend processing unit 23a then determines whether or not the representative counters 222a and 312a match (Step S18; refer to (ii) in FIG. 22).

In other words, the backend processing unit 23a is one example of a comparing unit configured to obtain the representative counter 312a from the controller 3a, and compare the obtained representative counter 312a, with the representative counter 222a stored in the DB 22.

If the representative counters 222a and 312a match (Yes from Step S18), the processing ends. Otherwise, if the representative counters 222a and 312a do not match (No from Step S18), the backend processing unit 23a issues a differential data obtainment request and a counter obtainment request, to the synchronization controlling unit 24a.

The differential data obtaining unit 242 in the synchronization controlling unit 24a extracts multiple individual counters 222b in the synchronization control counter 222 stored in the DB 22, and generates information for obtaining differential data by specifying those individual counters 222b (Step S19). The generated information may contain information about at least those multiple individual counters 222b in the synchronization control counter 222. The differential data obtaining unit 242 issues a REST API for sending generated information. The REST controlling unit 25a sends the generated information to the controller 3a via the network 1a through the framework of the REST (Step S20; refer (iii) to in FIG. 23).

As set forth above, the differential data obtaining unit 242 is one example of a sending unit configured to send multiple individual counters 222b stored in the DB 22 to the controller 3a when a comparison between the representative counters 222a and 312a results in a mismatch.

Figure 24:
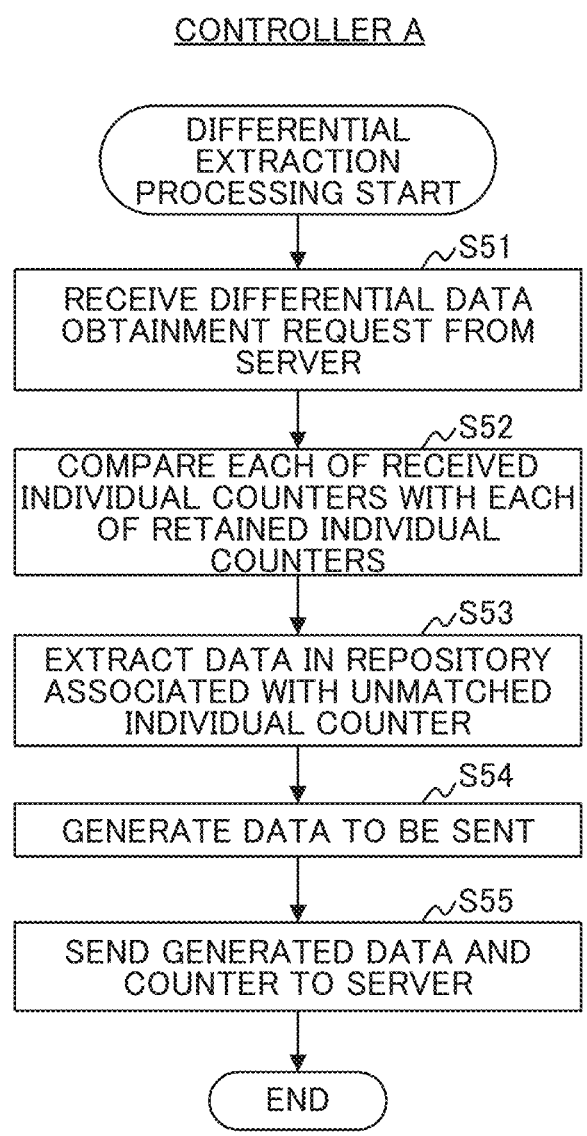
FIG. 24 is a flowchart illustrating an example of operations of differential extraction processing in accordance with one embodiment.
Figure 25:
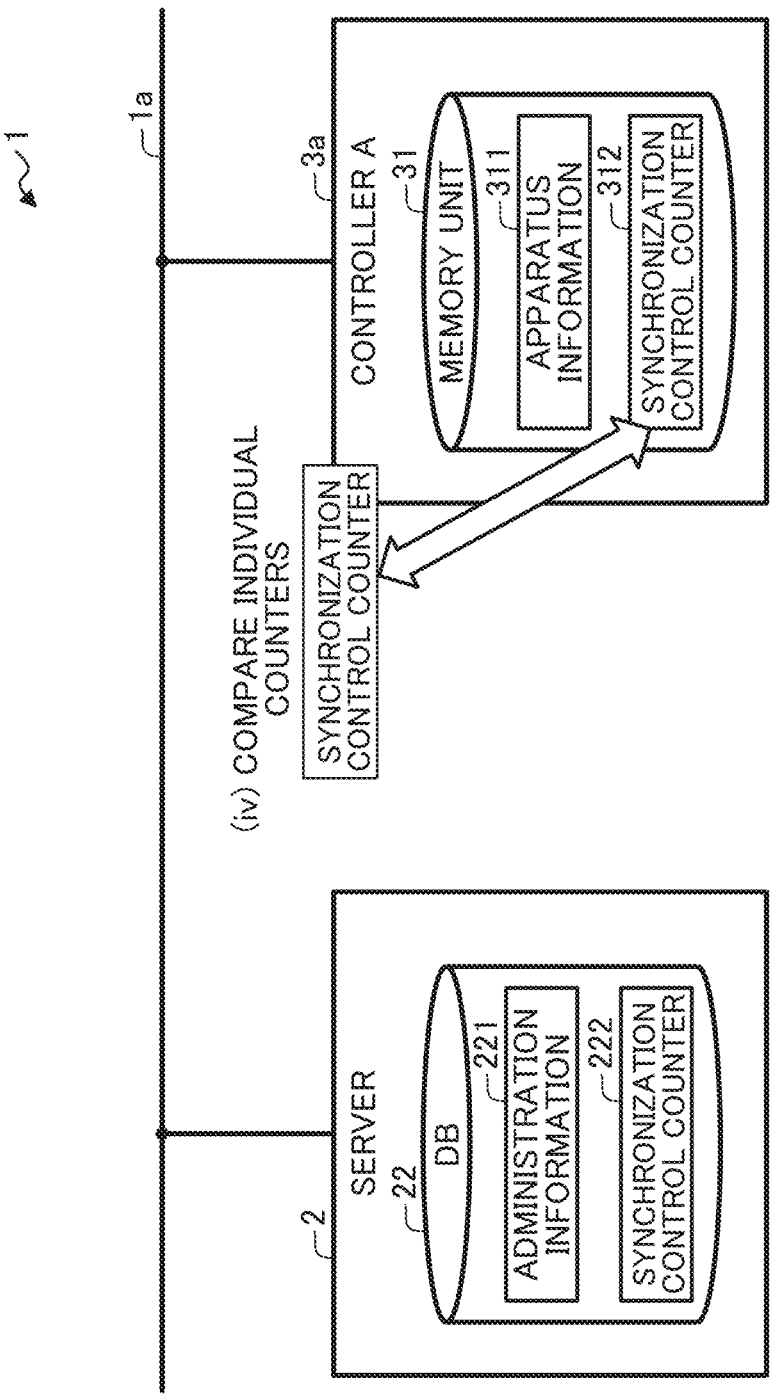
FIG. 25 is a diagram illustrating an example of operations of the differential extraction processing depicted in FIG. 24.
Figure 26:
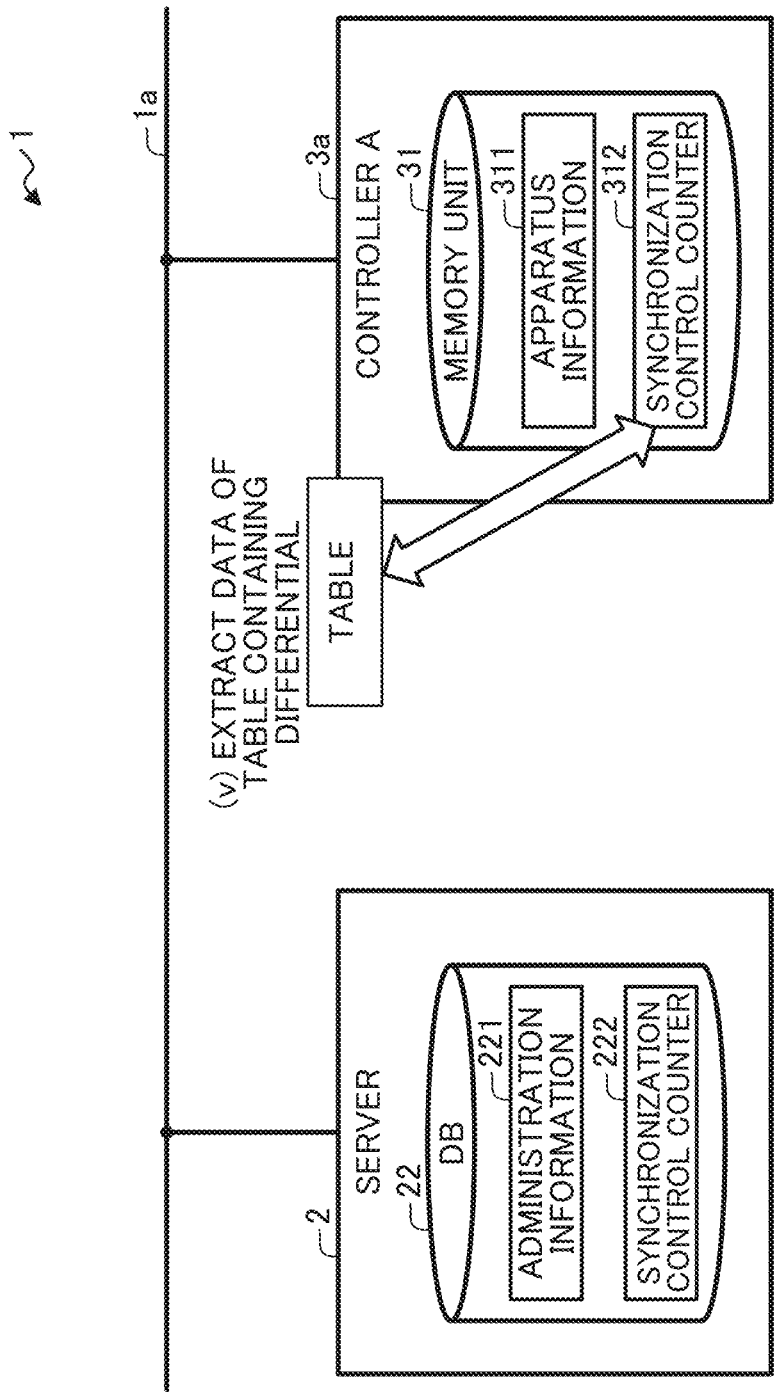
FIG. 26 is a diagram illustrating an example of operations of the differential extraction processing depicted in FIG. 24.

As exemplified in FIG. 24, in differential extraction processing, the counter comparing unit 341 in the controller 3a receives, from the server 2, a differential data obtainment request containing the information about at least the multiple individual counters 222b in the synchronization control counter 222 (Step S51). The counter comparing unit 341 compares each of individual counters 222b in the received synchronization control counter 222, with each of the individual counters 312b in the synchronization control counter 312 retained in the DB 31 (Step S52; refer to (iv) in FIG. 25).

The data generating unit 342 extracts data in a repository associated with individual counters 222b and 312b that mismatch in the comparison, from the DB 31 (Step S53). For example, the data generating unit 342 may extract data in a table or an entry range corresponding to the unmatched individual counters 222b and 312b, from the apparatus information 311 in the DB 31 (refer (v) to in FIG. 26). Based on the extracted data (e.g., the table or the entry range), the data generating unit 342 then generates data to be returned to the server 2 (Step S54).

Figure 27:
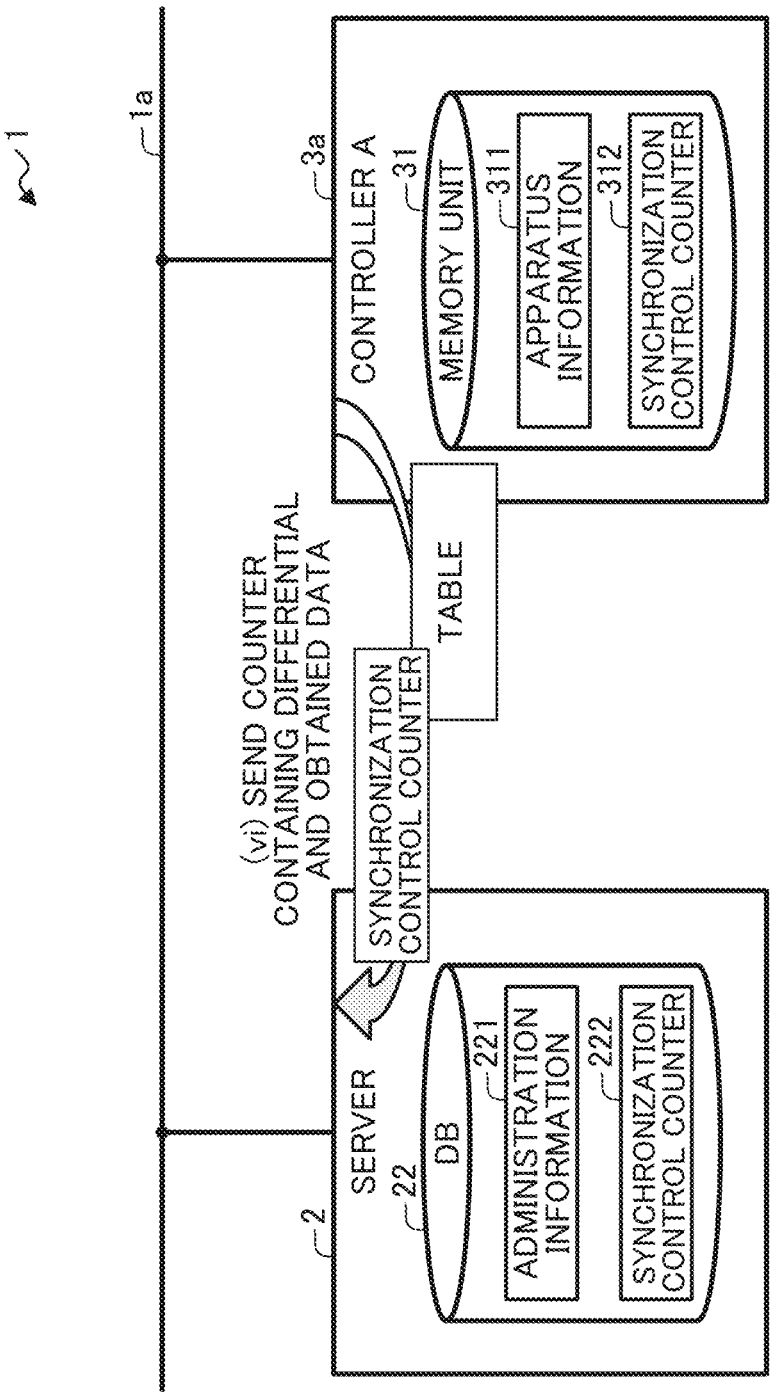
FIG. 27 is a diagram illustrating an example of operations of the synchronization processing depicted in FIG. 18.

The counter comparing unit 341 sends the return data from the data generating unit 342, and information on the current synchronization control counter 312, to the server 2 (Step S55; refer (vi) to in FIG. 27).

Note that the information on the synchronization control counter 312 sent from the controller 3a to the server 2 may include only information on an individual counter 312b corresponding to data containing the differential, and the representative counter 312a. This makes the data containing the differential and the corresponding individual counter 312b be readily identifiable in the server 2.

Referring back to descriptions of FIG. 18, the synchronization controlling unit 24a and the REST controlling unit 25a wait to receive the information on the differential data and the synchronization control counter 312 from the controller 3a (Step S21 and No from S21).

In response to the REST controlling unit 25a receiving the results of the request from the network 1a (Yes from Step S21), the differential data obtaining unit 242 in the synchronization controlling unit 24a passes the received synchronization control counter 312 to the data managing unit 243.

As set forth above, the differential data obtaining unit 242 is one example of a receiving unit configured to receive, from the controller 3a, one or more information elements, e.g. differential data of a table or an entry range or the like, extracted in the controller 3a, based on the multiple individual counters 222b that are sent. Note that, as set forth above, the differential data obtaining unit 242 as the receiving unit may receive, from the controller 3a, the latest representative counter 312a, and one or more individual counters 312b indicating respective update statuses of extracted one or more information elements.

Figure 28:
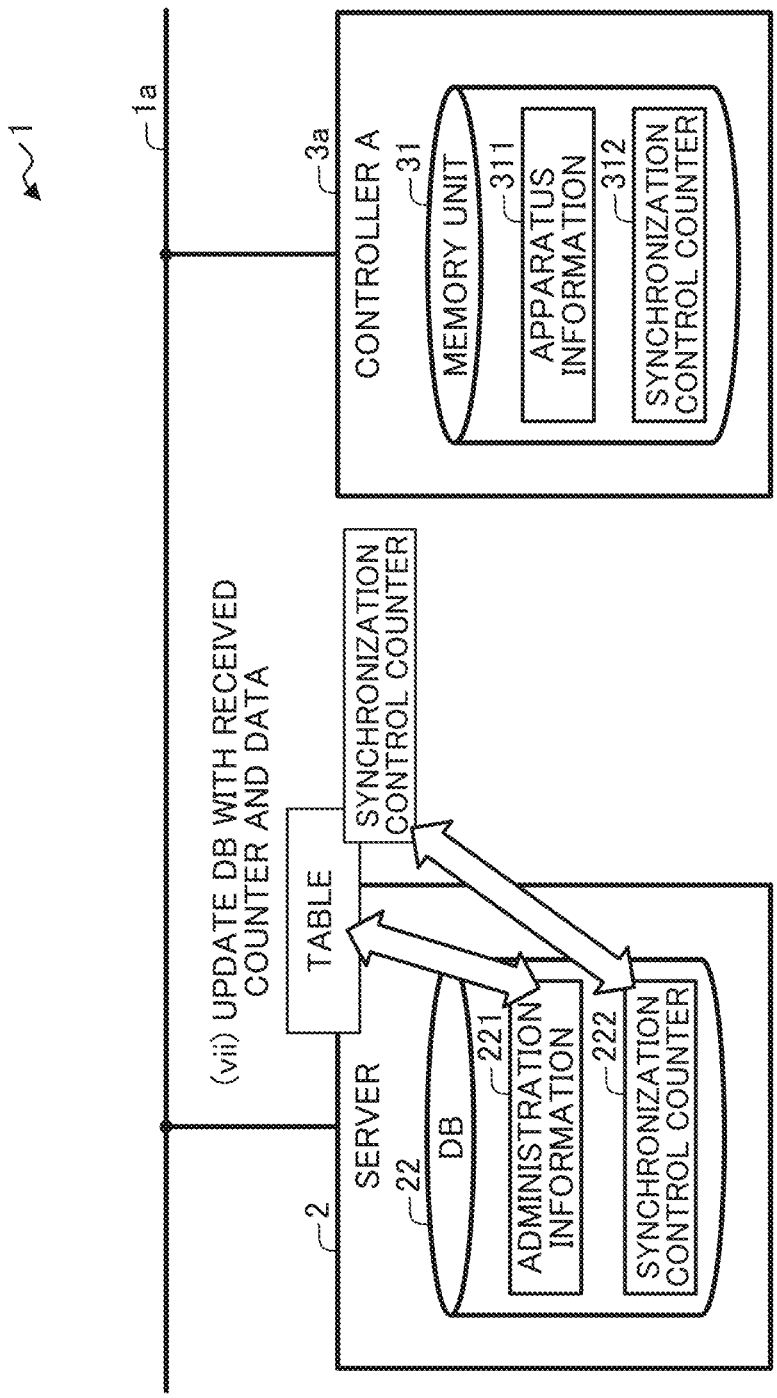
FIG. 28 is a diagram illustrating an example of operations of the synchronization processing depicted in FIG. 18.

The data managing unit 243 identifies the repository corresponding to the differential data from the DB 22 (Step S22) and reflects the information on the differential data and the synchronization control counter 312 into the repository (Step S23; refer to (vii) in FIG. 28), and the processing ends.

In other words, the data managing unit 243 is one example of an updating unit configured to update administration information 221 stored in the DB 22, based on the received one or more information elements.

For example, the data managing unit 243 may identify a table or an entry range corresponding to the differential data from the administration information 221 in the DB 22, and may update data in the table or the entry range identified by the differential data. In addition, the data managing unit 243 may update the representative counter 222a and the individual counter 222b corresponding to the differential data, in the synchronization control counter 222 in the DB 22, with the received information on the synchronization control counter 312. When the data managing unit 243 receives the synchronization control counter 312 per se, the data managing unit 243 may overwrite the synchronization control counter 222, with the synchronization control counter 312.

As described above, the server 2 sends comparative information (e.g., individual counters 222b) to the controller 3a, which makes differential data to be extractable on the controller 3. As a result, because data to be sent from the controller 3a to the server 2 is limited to differential data, the processing loads on the server 2 can be mitigated and the data volume being transferred on the network 1a can be reduced.

For example, for the controller 3b having comparatively smaller configuration information, the server 2 obtains the entire configuration information for synchronization. In contrast, as apparatus configurations become complicated as that in the storage apparatus 5a, obtainment of such configuration information using the synchronization technique similar to that used in the controller 3b would take longer time. In the technique in accordance with one embodiment, the server 2 synchronizes apparatus information 311 in the storage apparatus 5a with the controller 3a using differential data in place of the entire configuration information. This can prevent configuration information from affecting on the obtainment time, even when the configuration information is massive.

In addition, differential data is propagated on the network 1a on a table basis, for example. Because the apparatus information 311 is transmitted in the form of divided data in this manner, the data volume being transmitted on the network 1a can be controlled not to exceed the threshold capacity.

Furthermore, even when differential data is generated on a table basis, the data transmission volume may be increased in users operating on a massive scale. One of such examples is the situation where differential data is a table regarding volume information or SAN connection groups (e.g., volume table 311c). Even in such a situation, an increase in the data transmission volume can be suppressed because the individual counters 312b in the synchronization control counter 312 can be divided into pieces by entry ranges in tables in the apparatus information 311, and the like.

In addition, in the server 2, when a mismatch is found in a comparison between the representative counters 222a and 312a, it is possible to migrate the process to identify differential data in the apparatus information 311, to the controller 3a, thereby mitigating the loads. In addition, the controller 3a can identify differential data by comparing the individual counters 222b and 312b.

In the configuration as described above, the load on the side of the server 2 can be mitigated as compared to synchronization processing with the controller 3b, and the processing load on the controller 3a for extracting differential data can also be reduced. In addition, the server 2 can be configured not to retain comparative apparatus information 311 for identifying differential data.

(1-4) Examples of Hardware Configurations

Next, referring to FIG. 29, example of the hardware configurations of the server 2, the controllers 3a and 3b, and the servers 4, in accordance with one embodiment, will be described. Because the server 2, the controllers 3a and 3b, and the servers 4 may have similar hardware configurations, the hardware configuration of a computer 10 will be described, using the computer 10 as examples of the server 2, the controllers 3a and 3b, and the servers 4.

Figure 29:
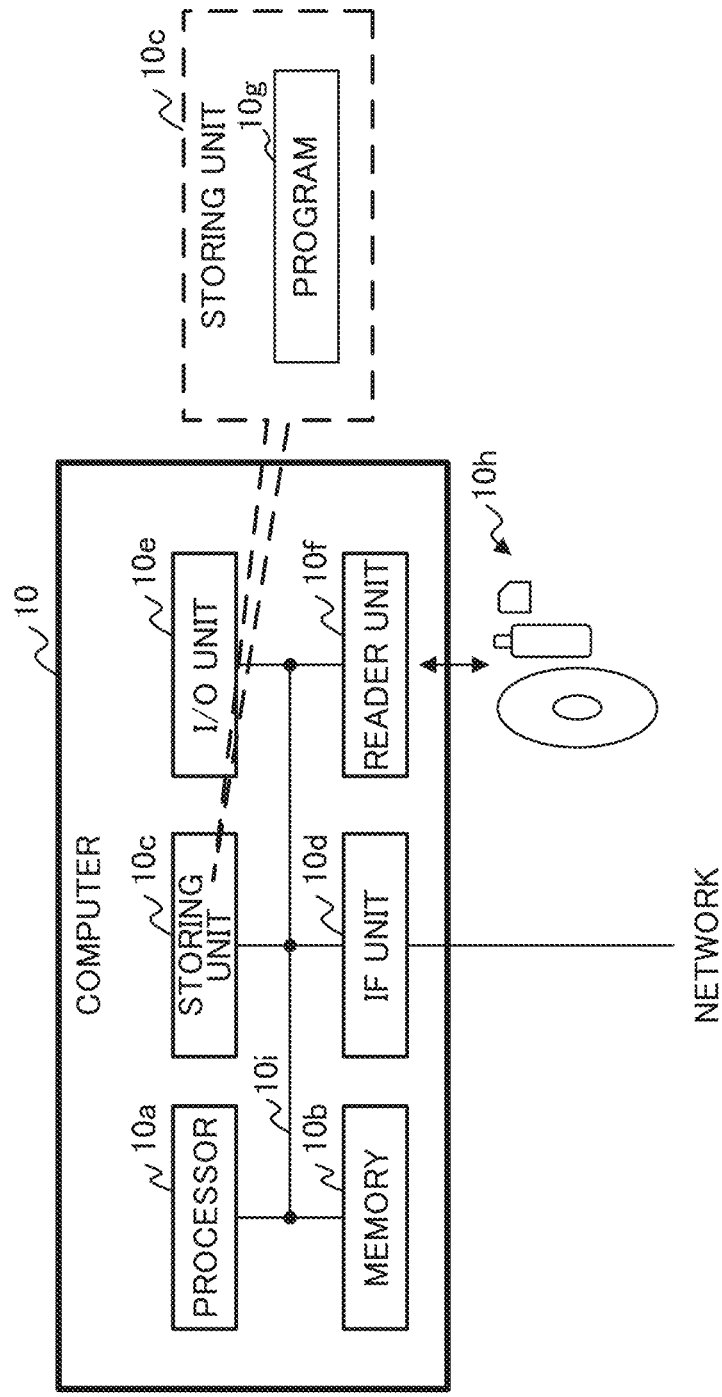
FIG. 29 is a block diagram depicting an example of a hardware configuration of a computer in accordance with one embodiment.

As depicted in FIG. 29, the computer 10 may include a processor 10a, a memory 10b, a storing unit 10c, an IF unit 10d, an input/output (I/O) unit 10e, and a reader unit 10f, for example.

The processor 10a is one example of a processing unit configured to perform a wide variety of controls and computations. The processor 10a may be communicatively connected to each other to each block in the computer 10 via a bus 10i. As the processor 10a, integrated circuits (ICs), such as CPUs, MPUs, GPUs, APUs, DSPs, ASICs, and FPGAs may be used, for example. Note that CPU is an abbreviation for Central Processing Unit, and MPU is an abbreviation for Micro Processing Unit. GPU is an abbreviation for Graphics Processing Unit, and APU is an abbreviation for Accelerated Processing Unit. DSP is an abbreviation for Digital Signal Processor, ASIC is an abbreviation for Application Specific IC, and FPGA is an abbreviation for Field-Programmable Gate Array.

The memory 10b is one example of hardware configured to store information, such as a wide variety of data and programs. Examples of the memory 10b include volatile memories, such as RAMs, for example.

The storing unit 10c is one example of hardware configured to store information, such as a wide variety of data and programs. Examples of the storing unit 10c include magnetic disk apparatuses, e.g., HDDs, solid state drive apparatuses, e.g., SSDs, and a wide variety of storing apparatuses, e.g., non-volatile memories, for example. Non-volatile memories include flash memories, storage class memories (SCMs), and read only memories (ROMs), for example.

Note that, in the server 2, the memory unit 21 and the DB 22 depicted in FIG. 13 may be embodied by storing areas in at least one of the memory 10b and the storing unit 10c in the server 2, for example. In addition, in the controller 3a, the DB 31 depicted in FIG. 14 may be embodied by storing areas in at least one of the memory 10b and the storing unit 10c in the controller 3a, for example.

In addition, the storing unit 10c may store a program 10g for embodying all or a part of the functions by the computer 10. The processor 10a can embody the functions as the server 2, the controller 3a or 3b, or the servers 4, by expanding the program 10g stored in the storing unit 10c into the memory 10b and executing the program 10g expanded on the memory 10b.

For example, in the server 2, the processor 10a in the server 2 can embody the functions as the backend processing unit 23, the synchronization controlling unit 24, and the IF controlling unit 25 by expanding the program 10g stored in the storing unit 10c into the memory 10b and executing computations processing. In addition, in the controller 3a, the processor 10a in the controller 3a can embody the functions as the firmware 32 by expanding the program 10g stored in the storing unit 10c into the memory 10b and executing computations processing.

The IF unit 10d is one example of a communication interface configured to carry out processing, such as controls on connections to and communications with networks. For example, the IF unit 10d may include an adaptor compliant with LAN or optical communication standards, e.g., the Fibre Channel (FC).

For example, the IF unit 10d in the server 2 may include a communication interface that controls connections to and communications with the networks 1a and 1c. The IF controlling unit 25 in the server 2 is one example of such a communication interface. In addition, the IF unit 10d in the controller 3a may include a communication interface that controls connections to and communications with the network 1a, and a communication interface that controls connections to and communications with the network 1b. Furthermore, the IF unit 10d in the controller 3b may include a communication interface that controls connections to and communications with the network 1c, and a communication interface that controls connections to and communications with the network 1d. In addition, the IF unit 10d in the server 4a may include a communication interface that controls connections to and communications with the network 1b, and the IF unit 10d in the server 4b may include a communication interface that controls connections to and communications with the network 1d.

For example, the program 10g for the server 2, the controller 3a or 3b, or the servers 4 may be downloaded from one of the networks 1a-1d via one of the communication interfaces described above, and may be stored in the storing unit 10c.

The I/O unit 10e may include either or both of: an input unit, such as a mouse, a keyboard, and operation buttons; and an output unit, such as a monitor, e.g., a touch panel display and a liquid crystal display (LCD), a projector, and a printer.

The reader unit 10f is one example of a reader configured to read information on data and programs recorded on a recording medium 10h. The reader unit 10f may include a connection terminal or device, to which the recording medium 10h can be connected or inserted. Examples of the reader unit 10f include adaptors compliant with the Universal Serial Bus (USB) standard, drive apparatuses for accessing recording disks, and card readers for accessing flash memories, e.g., SD cards. Note that the program 10g may be stored in the recording medium 10h, and the reader unit 10f may read the program 10g from the recording medium 10h and may store the program 10g in the storing unit 10c.

Examples of the recording medium 10h may include non-transitory recording media, such as magnetic/optical disks and flash memories, for example. Examples of magnetic/optical disks may include flexible disks, compact discs (CDs), digital versatile discs (DVDs), Blu-ray Discs, and holographic versatile discs (HVDs), for example. Examples of flash memories may include USB memories and SD cards, for example. Note that examples of CDs may include CD-ROMs, CD-Rs, and CD-RWs, for example. Further, examples of DVDs may include DVD-ROMs, DVD-RAMs, DVD-Rs, DVD-RWs, DVD+Rs, and DVD+RWs, for example.

The hardware configuration of the computer 10 described above is merely exemplary. Accordingly, hardware may be added or omitted in the computer 10 (e.g., any blocks may be added or omitted), divided, or combined in any combinations, or a bus may be added or omitted, where it is deemed appropriate.

(2) Miscellaneous

The above-describe technique in accordance with one embodiment may be practiced in the following modifications or variations.

For example, in the server 2, the functions of the backend processing unit 23, the synchronization controlling unit 24, and the IF controlling unit 25 may be combined in any combinations, or may be separate. In addition, the functions of the counter controlling unit 241, the differential data obtaining unit 242, and the data managing unit 243 in the synchronization controlling unit 24a in the server 2 may be combined in any combinations, or may be separate. Furthermore, the functions of the repository controlling unit 33 and the UI controlling unit 34 in the firmware 32 in the controller 3a may be combined in any combinations, or may be separate. In addition, the functions of the counter comparing unit 341 and the data generating unit 342 in the UI controlling unit 34 in the firmware 32 may be combined in any combinations, or may be separate.

In one aspect, apparatus information on a storage apparatus can be synchronized efficiently between a storage management apparatus and a storage controller.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage management apparatus connected via a network to a storage controller providing access to a storage apparatus, comprising:

a memory configured to store configuration information regarding a configuration of the storage apparatus, first update information indicating an update status of the configuration information, and a plurality of second update information pieces, the configuration information including a plurality of information elements, the plurality of second update information pieces indicating respective update statuses of the plurality of information elements; and a processor coupled to the memory, wherein the processor is configured to:
obtain a first counter from the storage controller that controls the storage apparatus;
compare the first counter with the first update information stored in the memory;
send, to the storage controller, the plurality of second update information pieces stored in the memory, when the first counter obtained from the storage controller does not match the first update information stored in the memory;
receive, from the storage controller, one or more information elements that are extracted in the storage controller based on the plurality of second update information pieces that are sent; and
update the configuration information stored in the memory based on the one or more information elements received,
wherein
values of second counters in the storage controller, corresponding to the plurality of second update information pieces, are updated in accordance with updating of the plurality of information elements by the storage controller, respectively, and
a value of the first counter is updated in accordance with a change in one or more of the values of the second counters by the storage controller.

2. The storage management apparatus according to claim 1, wherein the processor is further configured to receive, from the storage controller, the one or more information elements extracted based on a respective comparison between the pieces of the second update information, and the second counters stored in the storage controller.

3. The storage management apparatus according to claim 1, wherein the processor is further configured to:
receive, from the storage controller, the first counter, and one or more of the second counters indicating respective update statuses of the one or more information elements extracted in the storage controller; and
update the first update information and the plurality of second update information pieces, stored in the memory, based on the first counter and the one or more of the second counters that are received.

4. The storage management apparatus according to claim 1, wherein the plurality of information elements in the configuration information comprise one or more information elements associated with a storage volume provided in the storage apparatus.

5. The storage management apparatus according to claim 1,
further comprising a storing area configured to store additional configuration information regarding configuration of an additional storage apparatus having a product specification associated with an addition of a storage part different from that of the storage apparatus,
wherein the processor is further configured to:
suspend any comparing, sending, receiving, and updating, from being executed, in an additional storage controller that controls the additional storage apparatus;
obtain, from the additional storage controller, the additional configuration information regarding the configuration of the additional storage apparatus at a given timing; and
update the additional configuration information stored in the storing area based on the additional configuration information obtained from the additional storage apparatus.

6. A storage system comprising:
a first storage apparatus;
a storage management apparatus configured to manage the storage system; and
a first storage controller configured to control the first storage apparatus,
wherein the storage management apparatus includes:
a first memory configured to store first configuration information regarding a configuration of the first storage apparatus, first update information indicating an update status of the first configuration information, and a plurality of second update information pieces, the first configuration information including a plurality of information elements, the plurality of second update information pieces indicating respective update statuses of the plurality of information elements; and
a first processor coupled to the first memory, the first processor being configured to:
obtain a first counter from the first storage controller;
compare the first counter obtained from the first storage controller with the first update information stored in the first memory; and
send, to the first storage controller, the plurality of second update information pieces stored in the first memory, when the first counter does not match the first update information stored in the first memory,
wherein the first storage controller includes:
a second memory configured to store second configuration information regarding a configuration of the first storage apparatus; and
a second processor coupled to the second memory, the second processor being configured to extract one or more information elements from the second configuration information stored in the second memory in the first storage controller based on the plurality of second update information pieces received from the storage management apparatus, and send the one or more information elements to the storage management apparatus,
wherein the first processor in the storage management apparatus is further configured to update the configuration information stored in the first memory based on the received one or more information elements,
wherein the second processor in the first storage controller updates the second counters in accordance with updating of the plurality of information elements, respectively, and
updates the first counter in accordance with each change in the second counters.

7. The storage system according to claim 6, wherein the second processor in the first storage controller is further configured to send, to the storage management apparatus, the one or more information elements extracted based on a comparison between each of the plurality of second update information pieces, and each of the second counters stored in the second memory in the first storage controller.

8. The storage system according to claim 6, wherein
the second processor in the first storage controller is further configured to send, to storage management apparatus, the first counter stored in the second memory in the first storage controller, and one or more of the second counters indicating respective update statuses of the one or more information elements, and
the first processor in the storage management apparatus is further configured to update the first update information and the plurality of second update information pieces, stored in the first memory, based on the first counter and the one or more second counters that are received.

9. The storage system according to claim 6, wherein the plurality of information elements in the first configuration information comprises one or more information elements associated with a storage volume provided in the first storage apparatus.

10. The storage system according to claim 6,
further comprising:
a second storage apparatus having a product specification associated with addition of a storage part different from that of the first storage apparatus; and
a second storage controller configured to control the second storage apparatus, wherein
the storage management apparatus includes a storing area configured to store third configuration information regarding configuration of the second storage apparatus, and
the first processor is further configured to:
suspend any comparing, sending, and updating, from being executed in the second storage controller;
obtain, from the second storage controller, fourth configuration information regarding the configuration of the second storage apparatus at a given timing; and
update the third configuration information stored in the storing area based on the fourth configuration information.

11. A non-transitory computer-readable recording medium having stored therein a storage management program for causing a computer to execute a process comprising:
storing, in a memory, configuration information regarding configuration of a storage apparatus, first update information indicating an update status of the configuration information, and pieces of second update information, the configuration information including a plurality of information elements, the pieces of the second update information indicating respective update statuses of the plurality of information elements;
obtaining a first counter from a storage controller that controls the storage apparatus;
comparing the first counter with the first update information stored in the memory;
sending, to the storage controller, the pieces of the second update information stored in the memory, when the first counter does not match the first update information stored in the memory;
receiving, from the storage controller, one or more information elements that are extracted in the storage controller based on the pieces of the second update information; and updating the configuration information stored in the memory based on the one or more information elements,
wherein
values of the second counters are updated in accordance with updating of corresponding one of the plurality of information elements by the storage controller, respectively, and
a value of the first counter is updated in accordance with a change in one or more of the values of the second counters by the storage controller.

12. The non-transitory computer-readable recording medium according to claim 11, wherein the process further comprises receiving, from the storage controller, the one or more information elements extracted based on a respective comparison between the pieces of the second update information, and the second counters stored in the storage controller.

13. The non-transitory computer-readable recording medium according to claim 11, wherein:
the process further comprises receiving, from the storage controller, the first counter, and one or more of the second counters indicating respective update statuses of the one or more information elements extracted in the storage controller; and
the updating comprises updating the first update information and the pieces of the second update information, stored in the memory, based on the first counter and the one or more of the second counters that are received.

14. The non-transitory computer-readable recording medium according to claim 11, wherein the plurality of information elements in the configuration information comprise one or more information elements associated with a storage volume provided in the storage apparatus.

15. The non-transitory computer-readable recording medium according to claim 11, wherein the process further comprises:
storing, in a storing area, additional configuration information regarding configuration of an additional storage apparatus having a product specification associated with an addition of a storage part different from that of the storage apparatus;
suspend any obtaining, comparing, sending, receiving, and updating, from being executed in an additional storage controller that controls the additional storage apparatus;
obtaining, from the additional storage controller, the additional configuration information regarding the configuration of the additional storage apparatus at a given timing; and
updating the additional configuration information stored in the storing area based on the additional configuration information obtained from the additional storage apparatus.

* * * * *